United States Patent
Kobayashi et al.

(10) Patent No.: US 7,873,637 B2
(45) Date of Patent: Jan. 18, 2011

(54) AUTOMATICALLY IMPARTING AN INDEX BY USING VARIOUS KINDS OF CONTROL SIGNALS

(75) Inventors: Norihiko Kobayashi, Tokyo (JP); Toru Nakada, Kanagawa-ken (JP); Masaaki Yoshikawa, Tokyo (JP)

(73) Assignee: Panasonic Corporation, Osaka (JP)

( * ) Notice: Subject to any disclaimer, the term of this patent is extended or adjusted under 35 U.S.C. 154(b) by 668 days.

(21) Appl. No.: 10/583,045

(22) PCT Filed: Dec. 13, 2004

(86) PCT No.: PCT/JP2004/018568

§ 371 (c)(1),
(2), (4) Date: Jun. 15, 2006

(87) PCT Pub. No.: WO2005/057431

PCT Pub. Date: Jun. 23, 2005

(65) Prior Publication Data

US 2008/0154932 A1    Jun. 26, 2008

(30) Foreign Application Priority Data

Dec. 15, 2003  (JP)  ............... 2003-416929
Dec. 10, 2004  (JP)  ............... 2004-359053

(51) Int. Cl.
*G06F 17/30*  (2006.01)
(52) U.S. Cl. .............. 707/736; 707/741; 707/746; 704/270; 725/32; 725/74; 725/80
(58) Field of Classification Search .......... 707/3, 707/10, 104.1, 705, 736, 741, 746; 348/14.04, 348/14.12; 725/32, 74, 78, 80, 85, 105; 704/270, 704/275, 278
See application file for complete search history.

(56) References Cited

U.S. PATENT DOCUMENTS

| | | | | |
|---|---|---|---|---|
| 5,418,621 A | * | 5/1995 | Park | .................. 386/35 |
| 5,491,838 A | * | 2/1996 | Takahisa et al. | ........... 455/3.06 |
| 5,555,527 A | * | 9/1996 | Kotani et al. | ............... 365/222 |
| 5,564,073 A | * | 10/1996 | Takahisa | .................. 455/3.06 |

(Continued)

FOREIGN PATENT DOCUMENTS

JP    08-339379    12/1996

(Continued)

OTHER PUBLICATIONS

Japanese Search Report for Application No. PCT/JP2004/018568, dated Feb. 15, 2005.

(Continued)

*Primary Examiner*—Jean M Corrielus
(74) *Attorney, Agent, or Firm*—RatnerPrestia

(57) ABSTRACT

An index imparting system is capable of avoiding reconditioning work, automatically generating accurate metadata, and automatically imparting information relevant to a program. The index imparting system is provided with: a control signal detecting section to identify a type of each control signal and an identifier for uniquely specifying each control signal following the detection of various kinds of control signals and obtain time of the detection. An index generating section to generate metadata following the acquisition of a type, an identifier, and time identified at the control signal detecting section and, in the meantime, imparts attribute information to the metadata.

13 Claims, 24 Drawing Sheets

U.S. PATENT DOCUMENTS

| | | | | |
|---|---|---|---|---|
| 5,579,537 | A * | 11/1996 | Takahisa | 455/3.06 |
| 5,724,433 | A * | 3/1998 | Engebretson et al. | 381/106 |
| 5,805,524 | A * | 9/1998 | Kotani et al. | 365/238 |
| 5,805,545 | A * | 9/1998 | Nakamaru et al. | 369/47.23 |
| 5,949,733 | A * | 9/1999 | Kotani et al. | 365/230.03 |
| 6,023,440 | A * | 2/2000 | Kotani et al. | 365/230.03 |
| 6,091,823 | A * | 7/2000 | Hosomi et al. | 380/211 |
| 6,366,699 | B1 * | 4/2002 | Kuwano et al. | 382/199 |
| 6,501,856 | B2 * | 12/2002 | Kuwano et al. | 382/194 |
| 6,542,611 | B1 * | 4/2003 | Lane et al. | 381/66 |
| 6,637,028 | B1 * | 10/2003 | Voyticky et al. | 725/42 |
| 7,055,166 | B1 * | 5/2006 | Logan et al. | 725/32 |
| 7,126,642 | B2 * | 10/2006 | Takechi et al. | 348/445 |
| 7,228,305 | B1 * | 6/2007 | Eyal et al. | 707/100 |
| 7,293,279 | B1 * | 11/2007 | Asmussen | 725/102 |
| 7,318,099 | B2 * | 1/2008 | Stahl et al. | 709/229 |
| 7,487,072 | B2 * | 2/2009 | Semple et al. | 703/3 |
| 7,509,321 | B2 * | 3/2009 | Wong et al. | 707/7 |
| 7,640,560 | B2 * | 12/2009 | Logan et al. | 725/32 |
| 2002/0085116 | A1 | 7/2002 | Kuwano et al. | |
| 2003/0051252 | A1 * | 3/2003 | Miyaoku et al. | 725/109 |
| 2003/0187659 | A1 * | 10/2003 | Cho et al. | 704/275 |
| 2006/0218579 | A1 * | 9/2006 | Logan et al. | 725/32 |

FOREIGN PATENT DOCUMENTS

| | | |
|---|---|---|
| JP | 11-155122 | 6/1999 |
| JP | 11-167583 A | 6/1999 |
| JP | 11-338876 | 12/1999 |
| JP | 2001-069436 A | 3/2001 |
| JP | 2002-027374 A | 1/2002 |

OTHER PUBLICATIONS

English translation of Form PCT/ISA/210.

* cited by examiner

200 HEADER PART  
201 BODY PART 00000010 00000001 | 1010001001011101010101···

FORMER EIGHT BITS (TYPE INFORMATION)  
LATTER EIGHT BITS (IDENTIFIER)

| SIGNAL TYPE INFORMATION | IDENTIFIER INFORMATION | TYPE | IDENTIFIER |
|---|---|---|---|
| 00000010 | 00000001 | PIN MICROPHONE | PM-1 |
| 00000010 | 00000011 | PIN MICROPHONE | PM-2 |
| 00000010 | 00000111 | PIN MICROPHONE | PM-3 |
| 00000001 | 00000010 | VCR | VCR-1 |
| 00000001 | 00000011 | VCR | VCR-2 |
| 00000100 | 00000110 | TELOP | TP-1 |
| 00000100 | 00000011 | TELOP | TP-2 |
| 00001100 | 00000100 | CAMERA | StC-1 |
| 00001100 | 000000001 | CAMERA | StC-2 |
| ... | ... | ... | ... |

FIG. 8

| IDENTIFIER | ATTRIBUTE INFORMATION (PERSONAL NAME) |
|---|---|
| PM-1 | PERFORMER A |
| PM-2 | PERFORMER B |
| PM-3 | PERFORMER C |

(DEFAULT)

| IDENTIFIER | ATTRIBUTE INFORMATION (PERSONAL NAME) |
|---|---|
| PM-1 | TARO YAMADA |
| PM-2 | JIRO TANAKA |
| PM-3 | HANAKO SUZUKI |

(AFTER UPDATE)

FIG. 12

```
<MICROPHONE SIGNAL>
 <MICROPHONE ID=PM-1>
  <NAME>TARO YAMADA</NAME>
  <SPEECH TIME>
   <START TIME> t1</START TIME>
   <FINISH TIME>t2</FINISH TIME>
   <START TIME> t3</START TIME>
   <FINISH TIME>t4</FINISH TIME>
   <START TIME> t5</START TIME>
   <FINISH TIME>t6</FINISH TIME>
  </SPEECH TIME>
 </MICROPHONE>
 <MICROPHONE ID=PM-2>
  <NAME>JIRO TANAKA</NAME>
  <SPEECH TIME>
   <START TIME> t3</START TIME>
   <FINISH TIME>t4</FINISH TIME>
   <START TIME> t6</START TIME>
   <FINISH TIME>t7</FINISH TIME>
  </SPEECH TIME>
 </MICROPHONE>
 <MICROPHONE ID=PM-3>
  <NAME>HANAKO SUZUKI</NAME>
  <SPEECH TIME>
   <START TIME> t2</START TIME>
   <FINISH TIME>t3</FINISH TIME>
   <START TIME> t6</START TIME>
   <FINISH TIME>t8</FINISH TIME>
  </SPEECH TIME>
 </MICROPHONE>
</MICROPHONE SIGNAL>
```

FIG. 13

| IDENTIFIER | ATTRIBUTE INFORMATION (TITLE) | TIME |
|---|---|---|
| VCR-1 | × × × | 0:00:00 |
| VCR-1 | × × × | 0:00:00 |
| VCR-1 | × × × | 0:00:00 |

(DEFAULT)

| IDENTIFIER | ATTRIBUTE INFORMATION (TITLE) | TIME |
|---|---|---|
| VCR-1 | BURNED BODY CASE FOLLOW-UP STORY | 0:08:12 |
| VCR-1 | NAGATA-CHO ON THE EVE OF DISMISSAL | 0:05:30 |
| VCR-1 | SPORTS FEATURE PICTURE | 0:00:10 |

(AFTER UPDATE)

FIG. 14

```
<PICTURE SWITCHING>
  <VCR ID=VCR-1>
    <TITLE> BURNED BODY CASE FOLLOW-UP STORY </TITLE>
    <TIME>
      <START TIME>t1</START TIME>
      <TERM>00:08:12</TERM>
    </TIME>
    </VCR>
  <VCR ID=VCR-2>
    <TITLE> NAGATA-CHO ON THE EVE OF DISMISSAL </TITLE>
    <TIME>
      <START TIME>t2</START TIME>
      <TERM>00:05:30</TERM>
    </TIME>
  </VCR>
  <VCR ID=VCR-3>
    <TITLE> SPORTS FEATURE PICTURE </TITLE>
    <TIME>
      <START TIME>t3</START TIME>
      <TERM>00:00:10</TERM>
    </TIME>
  </VCR>
</PICTURE SWITCHING>
```

FIG. 15

| IDENTIFIER | ATTRIBUTE INFORMATION (PERSONAL NAME) | TYPE |
|---|---|---|
| TP-1 | × × × | △ △ △ |
| TP-2 | × × × | △ △ △ |
| TP-3 | × × × | △ △ △ |
| TP-4 | × × × | △ △ △ |

(DEFAULT)

| IDENTIFIER | ATTRIBUTE INFORMATION (PERSONAL NAME) | TYPE |
|---|---|---|
| TP-1 | TARO YAMADA | PERSONAL NAME |
| TP-2 | JIRO TANAKA | PERSONAL NAME |
| TP-3 | BURNED BODY CASE FOLLOW-UP STORY | TOPIC NAME |
| TP-4 | NAGATA-CHO ON THE EVE OF DISMISSAL | TOPIC NAME |

(AFTER UPDATE)

FIG. 16

```
<TELOP SWITCHING>
  <TELOP ID=TP-1>
    <CHARACTER STRING>TARO YAMADA</CHARACTER STRING>
    <TYPE>PERSONAL NAME</TYPE>
    <TIME>
      <START TIME>t1</START TIME>
    </TIME>
  </TELOP>
  <TELOP ID=TP-2>
    <CHARACTER STRING>JIRO TANAKA</CHARACTER STRING>
    <TYPE>PERSONAL NAME</TYPE>
    <TIME>
      <START TIME>t2</START TIME>
    </TIME>
  </TELOP>
  <TELOP ID=TP-3>
    <CHARACTER STRING>BURNED BODY CASE FOLLOW-UP
                     STORY</CHARACTER STRING>
    <TIME>
      <START TIME>t3</START TIME>
    </TIME>
    <TYPE>TOPIC NAME</TYPE>
  </TELOP>
  <TELOP ID=TP-4>
    <CHARACTER STRING>NAGATA-CHO ON THE EVE
           OFDISMISSAL</CHARACTER STRING>
    <TIME>
      <START TIME>t4</START TIME>
    </TIME>
    <TYPE>TOPIC NAME</TYPE>
  </TELOP>
</TELOP SWITCHING>
```

| PERSONAL NAME | GENDER | DATE OF BIRTH | HOMETOWN | OTHERS |
|---|---|---|---|---|
| TARO YAMADA | MALE | 1960/01/01 | TOKYO | ... |
| HANAKO SUZUKI | FEMALE | 1965/02/03 | OSAKA PREFECTURE | ... |
| JIRO TANAKA | MALE | 1968/03/03 | KANAGAWA PREFECTURE | ... |
| ... | | ... | ... | ... |

EXAMPLE OF PERSONAL DATABASE CONFIGURATION

72

| PICTURE INFORMATION | CONTENT | SHOOTING PLACE |
|---|---|---|
| BURNED BODY CASE FOLLOW-UP STORY | TESTIMONY ON BURNED BODY CASE OCCURRED EARLY ON OCTOBER 10TH | CHIBA CITY |
| NAGATA-CHO ON THE EVE OF DISMISSAL | ATMOSPHERE OF NAGATA-CHO ONE DAY BEFORE THE DISMISSAL OF THE LOWER HOUSE | NAGATA-CHO, CHIYODA-KU |
| SPORTS | TITLE | ... |
| ... | | ... |

EXAMPLE OF NEWS DATABASE CONFIGURATION

73

| CHARACTER STRING INFORMATION | PICTURE INFORMATION | PERFORMER | OTHERS |
|---|---|---|---|
| BURNED BODY CASE FOLLOW-UP STORY | BURNED BODY CASE FOLLOW-UP STORY | TARO YAMADA | |
| NAGATA-CHO ON THE EVE OF DISMISSAL | NAGATA-CHO ON THE EVE OF DISMISSAL | HANAKO SUZUKI | |
| SPORTS | | TARO YAMADA JIRO TANAKA | |
| | | | |

EXAMPLE OF SCRIPT DATABASE CONFIGURATION

FIG. 21

```
<MICROPHONE SIGNAL>
<MICROPHONE ID=PM-1>
 <NAME>TARO YAMADA</NAME>
 <SPEECH TIME>
  <START TIME> t1</START TIME>
  <FINISH TIME>t2</FINISH TIME>
  <START TIME> t3</START TIME>
  <FINISH TIME>t4</FINISH TIME>
  <START TIME> t5</START TIME>
  <FINISH TIME>t6</FINISH TIME>
 </SPEECH TIME>
 <PERSONAL INFORMATION>
  <GENDER>MALE</GENDER>
  <DATE OF BIRTH>1960/01/01</DATE OF BIRTH> ········· GENERATE METADATA FROM PERSONAL INFORMATION
  <HOMETOWN>TOKYO PREFECTURE</HOMETOWN>              RETRIEVED USING ATTRIBUTE
 </PERSONAL INFORMATION>                              INFORMATION (TARO YAMADA IN THIS CASE)
</MICROPHONE>                                         AS RETRIEVAL KEY, TOGETHER WITH SPEECH INFORMATION.
<MICROPHONE ID=PM-2>
 <NAME>JIRO TANAKA</NAME>
 <SPEECH TIME>
  <START TIME> t3</START TIME>
  <FINISH TIME> t4</FINISH TIME>           WHEN NOTHING HITS IN SEARCH USING ATTRIBUTE
  <START TIME> t6</START TIME>             INFORMATION (JIRO TANAKA IN THIS CASE) AS
  <FINISH TIME>t7</FINISH TIME> ·········· RETRIEVAL KEY, PERSONAL
 </SPEECH TIME>                            INFORMATION IS NOT IMPARTED.
</MICROPHONE>
```

FIG. 22

```
<PICTURE SWITCHING>
 <VCR ID=VCR-1>
  <TITLE> BURNED BODY CASE FOLLOW-UP STORY </TITLE>
  <CONTENT> TESTIMONY ON BURNED BODY CASE OCCURRED EARLY
           ON OCTOBER 10TH. </CONTENT>
  <TIME>
   <START TIME>t1</START TIME>
   <TERM>00:08:12</TERM>
  </TIME>
  <SHOOTING PLACE> CHIBA CITY </SHOOTING PLACE>
 </VCR>
 <VCR ID=VCR-2>
  <TITLE> NAGATA-CHO ON THE EVE OF DISMISSAL </TITLE>
  <CONTENT> ATMOSPHERE OF NAGATA-CHO ONE DAY BEFORE THE
           DISMISSAL OF THE LOWER HOUSE</CONTENT>
  <TIME>
   <START TIME>t2</START TIME>
   <TERM>00:05:30</TERM>
  </TIME>
  <SHOOTING PLACE> NAGATA-CHO </SHOOTING PLACE>
 </VCR>
 <VCR ID=VCR-3>
  <TITLE> SPORTS FEATURE PICTURE </TITLE>
  <CONTENT> TITLE </CONTENT>
  <TIME>
   <START TIME>t3</START TIME>
   <TERM>00:00:10</TERM>
  </TIME>
  <TYPE> TITLE PICTURE </TYPE>
 </VCR>
</PICTURE SWITCHING>
```

AUTOMATICALLY IMPARTING AN INDEX BY USING VARIOUS KINDS OF CONTROL SIGNALS

THIS APPLICATION IS A U.S. NATIONAL PHASE APPLICATION OF PCT INTERNATIONAL APPLICATION PCT/JP2004/018568.

FIELD OF THE INVENTION

The present invention relates to an index imparting technology of automatically imparting an index by using various kinds of control signals used at a program creating site in a broadcast station system.

BACKGROUND OF THE INVENTION

As a means of automatically imparting an index in a broadcast program, generally adopted is the means of: identifying a program performer or a speaker in a specific scene by using a face image recognition technology, a telop character recognition technology, a voice recognition technology, or a speaker recognition technology; transforming the result into metadata; and imparting an index. For example, as disclosed in JP-A No. 167583/1999, there is a means of recognizing a character string of a telop and thereby imparting the result to a picture as metadata. Here, the term "metadata" means data describing identifiers, names, performers, subjects and others in the contents of a broadcast program and the like.

In the case of a face image recognition technology, the recognition rate has varied in response to a screen position, a background picture, simultaneous display of plural objects and the like, and it has been difficult to obtain metadata of a high degree of accuracy. In the case of a telop character recognition technology too, a display position of telop characters, a background picture, a character font and the like have been restricted, and it has been difficult to realize the recognition of high probability which is not affected by environments. Further, in the cases of a voice recognition technology and a speaker recognition technology too, false recognition has occurred frequently in a program wherein plural speakers appear in a mixed manner or an indefinite number of speakers appear frequently, and the load of manual reconditioning work has been required likewise.

In consequence, when one of the above technologies is used, manual intervention (reconditioning work) has been necessary in order to impart accurate metadata and the reality has been far from the automatic impartment of metadata which can minimize manual reconditioning work.

SUMMARY OF THE INVENTION

The present invention has been established in view of the above situation and the object thereof is to provide an index imparting system which is capable of avoiding reconditioning work, automatically generating accurate metadata, and automatically imparting information relevant to a program.

An automatic index imparting system according to the present invention, which is an index imparting system which automatically imparts metadata by using control signals of various kinds of devices used in a broadcast station, is characterized by including: a control signal detecting section to identify the type of each control signal and an identifier for uniquely specifying each control signal following the detection of various kinds of control signals and obtain the time of the detection; a control signal attribute information managing section to manage the identifier of a control signal and attribute information relevant thereto in a tied manner beforehand and then identify the attribute information on the basis of an identifier obtained at the control signal detecting section; and an index generating section to generate metadata following the acquisition of a type, an identifier, and time identified at the control signal detecting section and, in the meantime, impart the attribute information obtained by the request from the control signal attribute information managing section to the metadata.

Further, an automatic index imparting system according to the present invention is characterized by including a log analyzing section to generate log data wherein time is sorted for each identifier following the acquisition of an identifier and time from the control signal detecting section and output the log data to the index generating section. The log analyzing section is characterized by including: a log output section to generate log data wherein time is sorted for each identifier by using an identifier and detected time of a control signal and output the log data to a network or a removable medium; and a log input section to input the log data via the network or the removable medium and send the log data to the index generating section.

Furthermore, an automatic index imparting system according to the present invention is characterized in that the control signal attribute information managing section includes a database searching section connected to a database which stores detailed information of attribute information and automatically imparts the detailed information obtained from the database to metadata generated at the index generating section. Here, the database which stores detailed information of attribute information is characterized by being a database which stores detailed information on at least any one of a person, news, and a script.

In the present invention, a control signal detecting section is configured so as to detect various kinds of control signals used during the broadcast of a program, identify the type, the identifier, and the time of each control signal and automatically generate metadata following the acquisition of them by an index generating section. Further, the index generating section is configured so as to request and obtain attribute information tied to the identified identifier from a control signal attribute information managing section wherein each of the identifiers of the various kinds of control signals and the attribute information thereof are managed in a tied manner and automatically impart the attribute information to the metadata. That is, the present invention makes it possible to automatically generate metadata showing a variety of information composing program broadcast in a synchronizing manner during the broadcast of the program and yield the effects of allowing conventional manual metadata generating work to be considerably reduced and accurate information to be imparted.

Further, by the present invention, since it is configured so as to generate log data wherein time is sorted for each identifier and output the log data to the index generating section by using a log analyzing section, it is possible to generate metadata collectively by using the log data. Furthermore, by generating the log data, it is possible to automatically generate metadata showing a variety of information composing program broadcast at any time during the broadcast of the program even when it is not synchronized and yield the effects of allowing conventional manual metadata generating work to be considerably reduced and accurate information to be imparted.

In addition, by the present invention, it is possible to obtain detailed information relevant to a person, news, a script, and others from another database by further using attribute information obtained on the basis of an identifier as a retrieval key and impart the detailed information to metadata. Thereby, it is possible to automatically generate accurate metadata containing plentiful information even when the obtained attribute information is insufficient.

BRIEF DESCRIPTION OF THE DRAWINGS

FIG. 8 illustrates tables showing a corresponding relationship between an identifier and attribute information registered in an attribute information database (pin microphone);

FIG. 12 shows an example of expressing index information generated by detecting a voice control signal in the form of XML;

FIG. 13 illustrates tables showing a corresponding relationship between an identifier and attribute information registered in an attribute information database (VCR);

FIG. 14 shows an example of expressing index information generated by detecting a VCR control signal in the form of XML;

FIG. 15 illustrates tables showing a corresponding relationship between an identifier and attribute information registered in an attribute information database (telop);

FIG. 16 shows an example of expressing index information generated by detecting a telop control signal in the form of XML;

FIG. 19 illustrates tables showing information registered in various kinds of external databases;

FIG. 21 shows an example of imparting information obtained from an external database to index information and expressing the information in the form of XML (pin microphone);

FIG. 22 shows an example of imparting information obtained from an external database to index information and expressing the information in the form of XML (telop);

BEST MODE FOR CARRYING OUT THE INVENTION

Embodiments of the present invention are hereunder explained in detail in reference to drawings. The gist of the present invention is to: detect control signals of various kinds of devices used in a station system for broadcasting programs at a control signal detecting section; obtain the type, the identifier, and the time of each control signal and generate metadata; further obtain attribute information tied to the control signal detected at the control signal detecting section from a control signal attribute information managing section; impart it to the metadata; thereby generate the metadata of a program automatically and accurately; and thus automatically impart the information to the metadata. Here, a type is the term used to identify the type of a device, and an identifier is the term imparted in order to uniquely specify a device of the same type.

Embodiment 1

Figure 1:
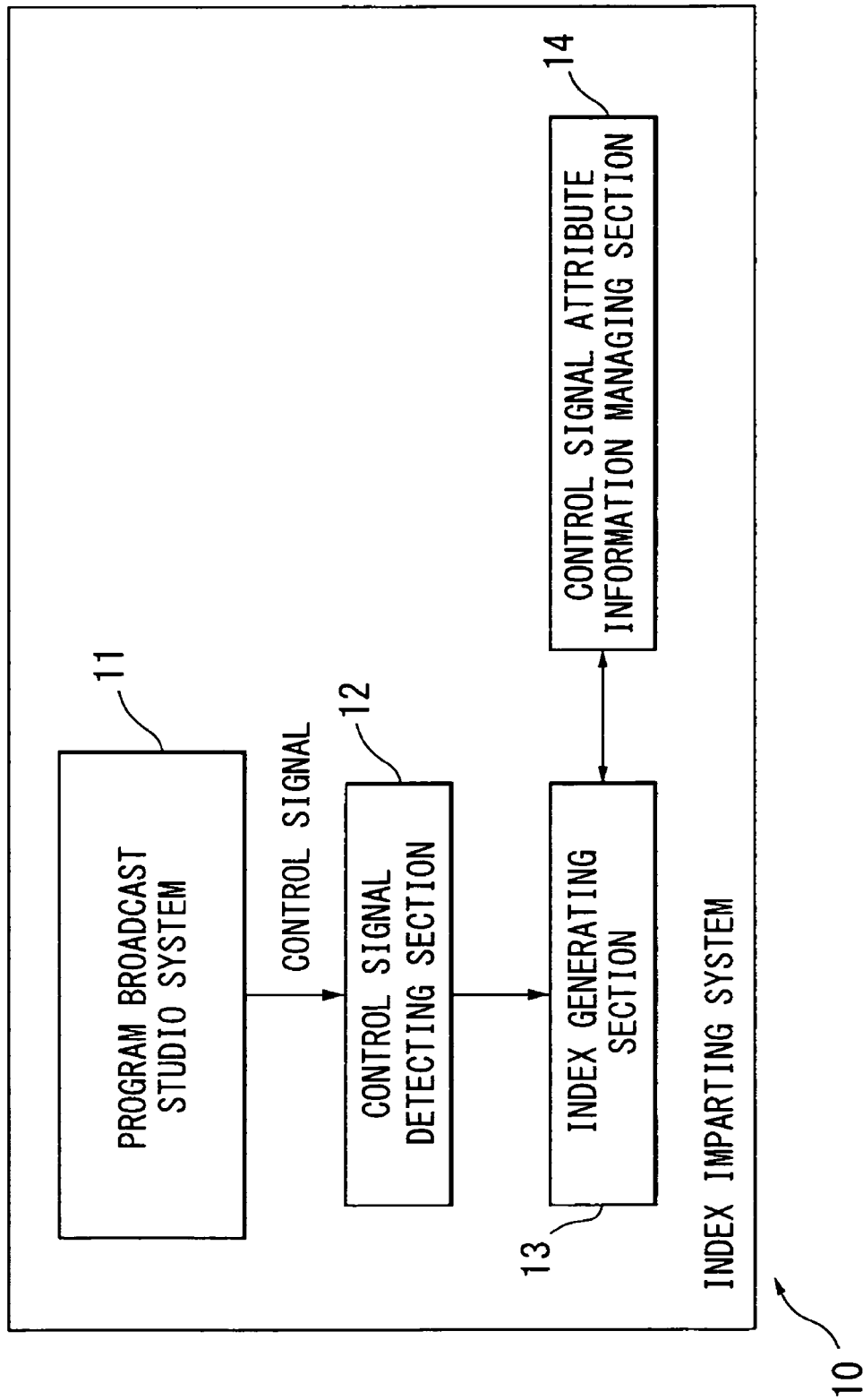
FIG. 1 is a block diagram showing a general configuration of an index imparting system according to an embodiment of the present invention.

A first embodiment according to the present invention is explained hereunder. FIG. 1 shows the configuration of the main block of an index imparting system according to an embodiment of the present invention. An index imparting system 10 shown in FIG. 1 includes: a program broadcast studio system 11 to produce, record, and deliver a broadcast program; a control signal detecting section 12 to detect control signals output from the program broadcast studio system 11 when the program is broadcast and identify the type, the identifier, the time, and others of each control signal; a control signal attribute information managing section 14 to manage the identifier of the control signal and attribute information relevant thereto in a tied manner beforehand and then identify attribute information on the basis of an identifier obtained at the control signal detecting section 12; and an index generating section 13 to generate metadata following the acquisition of a type, an identifier, detection time, and others from the control signal detecting section 12 and, in the meantime, impart attribute information obtained by the request from the control signal attribute information managing section 14 to the metadata.

Figure 2:
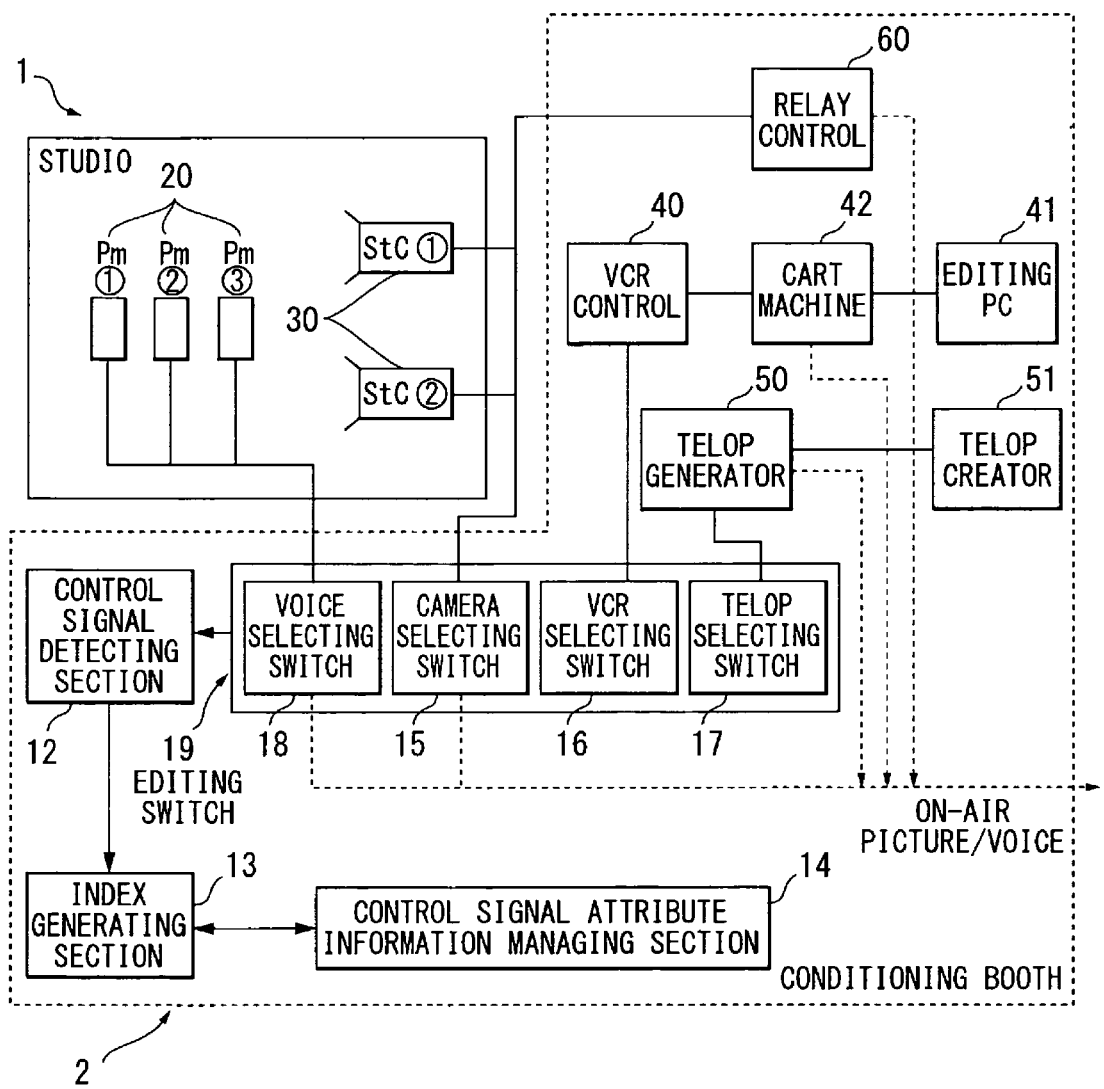
FIG. 2 is a block diagram showing a system operation type of an index imparting system used in a broadcast station (Embodiment 1)

FIG. 2 is a block diagram showing a general configuration of a broadcast system which may be presumed when an index imparting system 10 is actually applied to a broadcast station and the like. The broadcast system mainly includes a studio 1 and a conditioning booth 2 which issues instructions to the studio 1, receives image signals, voice signals and others from the studio 1, and carries out the production, recording, and delivery work of a program.

In the studio 1, disposed are pin microphones 20 (Pm1, Pm2, and Pm3) as microphones which announcers and performers put on, studio cameras 30 (StC1 and StC2), and others. Further, in the conditioning booth 2, in addition to the control signal detecting section 12, the index generating section 13, and the control signal attribute information managing section 14, which are shown in FIG. 1, there are disposed an editing switch 19 to unify management by incorporating a camera selecting switch 15 to select an on-air picture to be broadcast by changing a studio camera (StC1 or StC2) in the studio 1, a VCR selecting switch 16 to change a picture recorded in a VCR, a telop selecting switch 17 to change a telop image to be inserted into a camera picture, and a voice selecting switch 18 to select a voice to be collected by switching a microphone which is worn by a performer; a telop generator 50 to generate a telop image; a telop creator 51 to control the generating operation of a telop at the telop generator 50; a VCR controller 40 to control the recording and reproducing operations of a VCR; an editing PC (personal computer) 41 to handle editing work of program broadcast materials; a cart machine 42 to actually implement reproduction treatment of a VCR; and a relay controller 60 to implement control for relay broadcasting.

The editing switch 19 is connected to the control signal detecting section 12 and the control signal detecting section 12 detects various kinds of control signals sent from the editing switch 19. That is, the control signal detecting section 12 detects the input of control signals, which various devices output, such as pin microphone voice signals output from the pin microphones 20, studio camera switching signals output from the studio cameras 30, VCR switching signals output from the VCR controller 40, telop switching signals output from the telop generator 50, and others. Here, the pin microphones 20, the studio cameras 30, the VCR controller 40, the editing PC 41, the cart machine 42, the telop generator 50, the telop creator 51, the relay controller 60, and others are connected as shown in FIG. 2.

Figure 3:
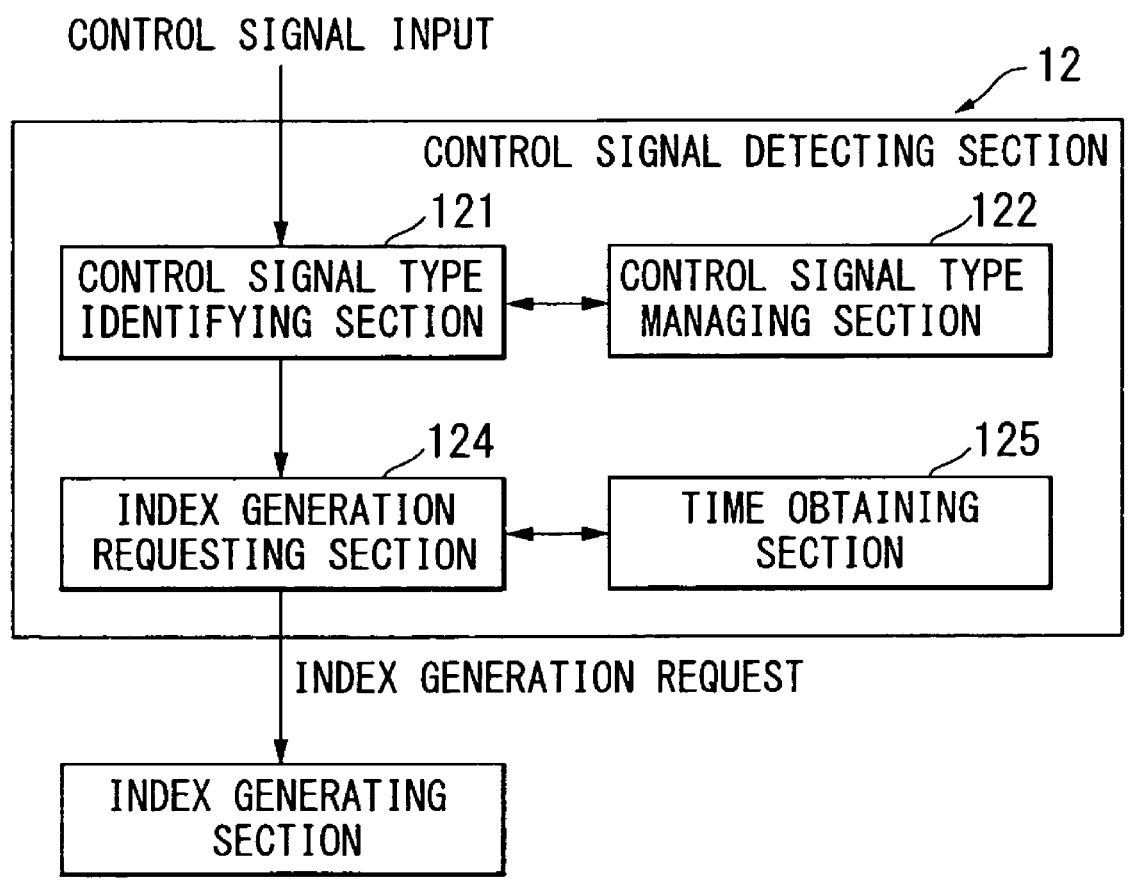
FIG. 3 is a block diagram showing an internal configuration of a control signal detecting section.

Next, the internal configuration of the control signal detecting section 12 is explained with FIG. 3. The control signal detecting section 12 plays the roles of: detecting an input control signal; identifying the type and the identifier thereof; obtaining the time; and then requesting the generation of metadata from the index generating section 13. The control signal detecting section 12 includes: a control signal type identifying section 121 to detect a control signal and identify the type and the identifier thereof; a control signal type managing section 122 to manage a control signal and the type and the identifier thereof in a tied manner in order to enable the identification of the control signal; a time obtaining section 125 to obtain the time when a control signal is detected; and an index generation requesting section 124 to send the identified type and identifier and the obtained time to the index generating section 13 and request the generation of metadata. Here, in the control signal type managing section 122, control signals are registered before the operation of a system and the types and the identifiers thereof are also registered beforehand. An identifier may be registered automatically following the registration of a control signal.

Figure 4:
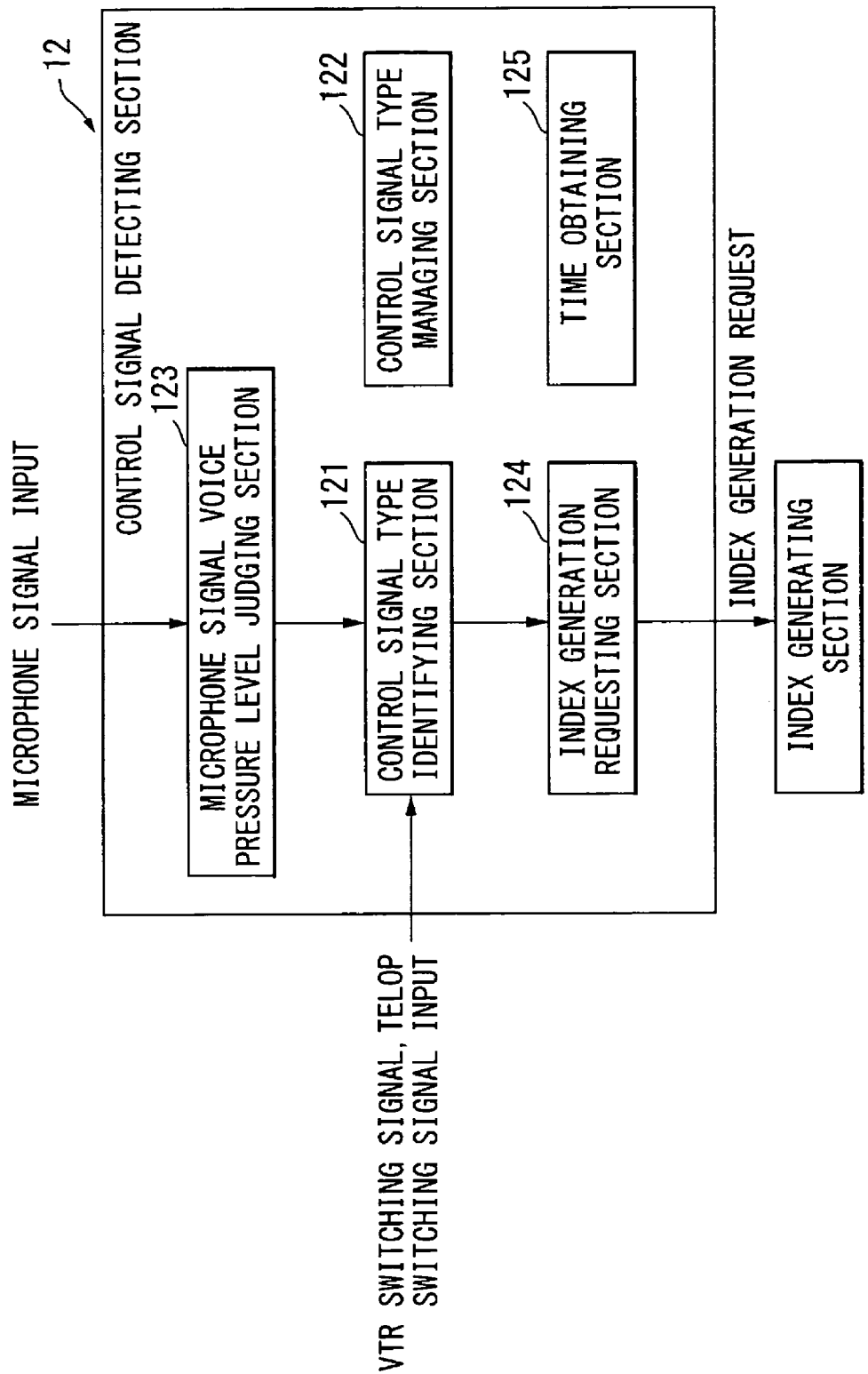
FIG. 4 is a block diagram showing an internal configuration of a control signal detecting section to detect a voice pressure level.

The control signal type identifying section 121 analyzes the header part of an input control signal and thereby identifies the type and the identifier thereof. A control signal is divided into two parts; a header part 200 containing information on the type and the identifier thereof and others and a body part 201 including the control signal itself. The control signal type identifying section 121 analyzes the bit string of the header part 200 which represents the type of a signal, compares the result with a signal type 211 and a signal ID 210 (identifier) which are registered in the control signal type managing section 122, and thereby identifies the type and the identifier of the input control signal. Further, FIG. 4 shows the internal configuration of the control signal detecting section 12 in the case of judging the voice pressure level of a voice signal as a control signal. A voice input from a microphone 30 which is provided to a program performer is input into a microphone signal voice pressure level judging section 123 through a voice selecting switch 18. The microphone signal voice pressure level judging section 123 detects the voice pressure level of an input voice.

Figures 5, 6:
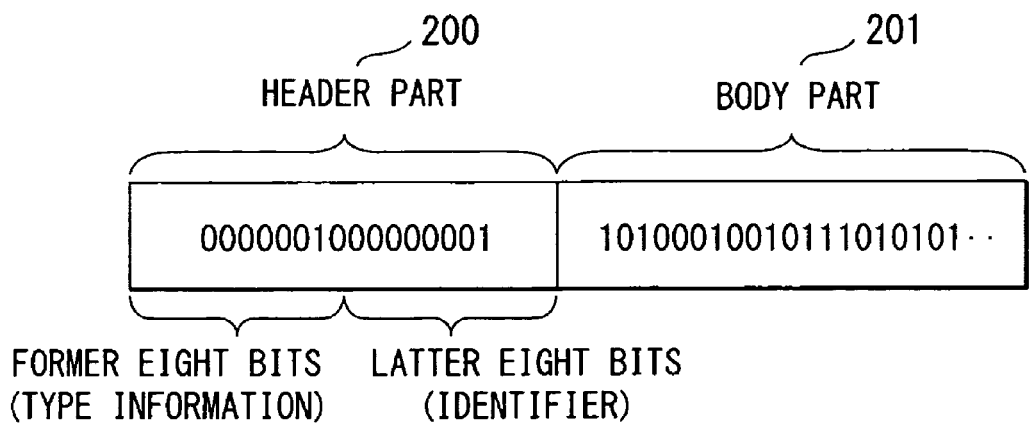
FIG. 5 is a view showing a structure of a digitized control signal.
FIG. 6 is a table showing a configuration of data which is managed at a control signal type managing section.

FIG. 5 is a view showing an example of the structure of a digitized control signal. Information showing a signal type is allocated to the former eight bits of the header part 200 of a control signal and information showing an identifier uniquely specifying the signal type is allocated to the latter eight bits thereof. FIG. 6 is a table showing an example of the configuration of data which is managed at the control signal type managing section 122. The control signal type managing section 122 manages: information 211 to show the type of a control signal; identifier information 212 to uniquely specify the signal type; a type 213 corresponding to the signal type information 211; and a signal ID (identifier) 210 corresponding to the identifier information 212, in a tired manner in the form of a table.

When a control signal shown in FIG. 5 is input into the control signal type identifying section 121 of the control signal detecting section 12, the control signal type identifying section 121 extracts the header part of the control signal and inquires the type and the identifier thereof from the control signal type managing section 122. At the control signal type managing section 122, since the former eight bits of the header part 200 showing the signal type information are [00000010], the control signal type managing section 122 judges that the item conforming to the type 213 tied to the signal type information 211 is "pin microphone," and further, since the latter eight bits thereof are [00000001], the control signal type managing section 122 judges that the item conforming to the identifier 210 tied to the identifier information 212 is "PM-1." By so doing, the control signal type managing section 122 judges that the type of the input control signal is "pin microphone" and the identifier thereof is "PM-1," and notifies the control signal type identifying section 121 of the terms "pin microphone" and "PM-1."

In this case here, although the control signal type identifying section 121 is notified of a type and an identifier, the control signal type identifying section 121 may be notified of only the identifier ("PM-1") if the type can be identified from only the identifier. Further, the size, the position, and others of a bit string for the identification of the type and the identifier of a signal are not limited to the aforementioned example. Furthermore, with regard to the conversion process from an input signal to an identifier too, it is also acceptable: to identify the type and the identifier thereof directly from an analog signal; or to individually prepare input routes of a number corresponding to the number of control signals to be detected at the control signal type identifying section 121 and identify an input signal input from each of the separate input routes. In addition, it is also acceptable to prepare a GUI (graphical user interface) function at an editing switch 19, make the connection between an input signal and an identifier beforehand with the GUI, and convert the input signal to the identifier.

Figure 7:
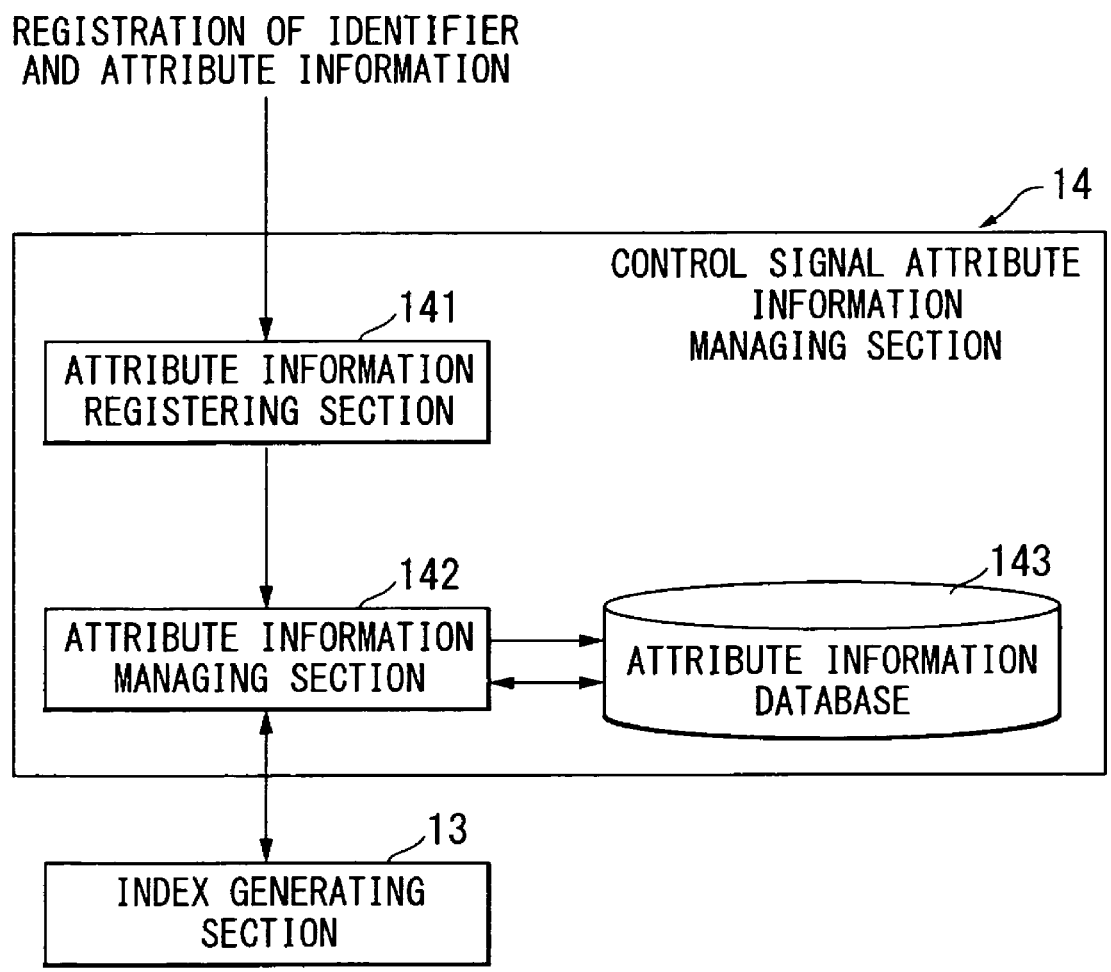
FIG. 7 is a block diagram showing an internal configuration of a control signal attribute information managing section.

Next, the internal configuration of the control signal attribute information managing section 14 is explained with FIG. 7. In the control signal attribute information managing section 14, various kinds of control signals and attribute information are registered beforehand in a tied manner. For example, the control signal attribute information managing section 14 is configured so as to manage an identifier uniquely specifying a control signal and attribute information beforehand in a tied manner and identify the attribute information on the basis of an identifier which the control signal detecting section 12 has obtained.

The control signal attribute information managing section 14 includes: an attribute information registering section 141 to register the identifiers and attribute information of various kinds of control signals; an attribute information managing section 142 to implement management including receiving registration from the attribute information registering section 141, registering the attribute information to an attribute information database 143, receiving attribute information requirement from the index generating section 13, and reading out attribute information from the attribute information database 143 on the basis of an identifier; and the attribute information database 143 to store the type and the identifier of a control signal and attribute information corresponding thereto in a tied manner.

Attribute information can also be registered online from various kinds of devices used in a broadcast station instead of being registered manually by a person involved in the production or edition of a program. For example, it is possible to: divert information such as a character string created at a telop creator 51, a picture of a VCR edited at an editing PC 41 and the like; and register attribute information online in a manner of being tied to the identifier of each of the various kinds of devices. By so doing, the registration work of attribute information showing a character string, picture information and the like is alleviated. In addition to that, it is also possible to: store a character string and picture information created or edited and the like in a removable medium; and register attribute information by using the removable medium.

Successively, the index generating section 13 is explained. The index generating section 13 plays the roles of: generating metadata following the acquisition of the type and the identifier of a control signal and the detection time; and, in the meantime, requesting attribute information tied to the obtained identifier from the control signal attribute information managing section 14 and imparting the attribute information obtained from the control signal attribute information managing section 14 to the generated metadata.

Next, hereunder explained is the flow of processes from the detection of control signals of various kinds of devices to the generation of metadata in an index imparting system configured as stated above.

<A Case where the Control Signal of a Pin Microphone is Detected>

Firstly, the generation of metadata when a pin microphone is used is explained. A general style of program recording is that each of program performers puts on a pin microphone and thereby the pin microphone of a performer collects the voice of the performer's own. In the case of a news program and the like wherein clear voice is required in particular, a pin microphone capable of keeping the distance from the mouth of a speaker constant is preferably used. An advantage of the use of a pin microphone is that it hardly picks up voice spoken by other performers in addition to that the distance from the mouth of a speaker can easily be kept constant and a clear voice can be obtained as stated above. That is, it can be said that a pin microphone accumulates only voice spoken by a specific person and hence it is estimated that voice input into a pin microphone can be correlated with a specific person.

As explained already, in the control signal type managing section 122 of the control signal detecting section 12, the control signals, the types, and the identifiers of various kinds of devices are registered before a program is broadcast and recorded. That is, the control signal, the type, and the identifier of a pin microphone are registered beforehand so as to be able to: identify the signal of the pin microphone when a voice control signal for the change to voice is detected; and further identify the pin microphone which has received the input, and, after the detection of the control signal, it is converted into a type and an identifier. In the meantime, the person who puts on a pin microphone (the person corresponding to an identifier) is registered to the control signal attribute information managing section 14 beforehand.

FIG. 8 includes the tables showing the relationship between a pin microphone identifier registered in the attribute information database 143 of the control signal attribute information managing section 14 and a performer who puts on the pin microphone and it is assumed in FIG. 8 that an identifier corresponding to a signal which a pin microphone outputs and a pin microphone wearer are registered and managed in pairs. FIG. 8 shows that PM-1, PM-2, and PM-3 as the identifiers of pin microphones are tied to a performer A, a performer B, and a performer C, respectively, in a default state. The attribute information is subjected to renewal processing for the attribute information registering section 141 at the stage of actually registering the performers and thereby Taro Yamada, Jiro Tanaka, and Hanako Suzuki who are the wearers of the pin microphones are tied, renewed and managed. Further, in the attribute information database 143, previously set attribute information is recorded and subsequently attribute information can easily be correlated with an identifier by a selecting means from the attribute information database 143 or another means.

Figure 9:
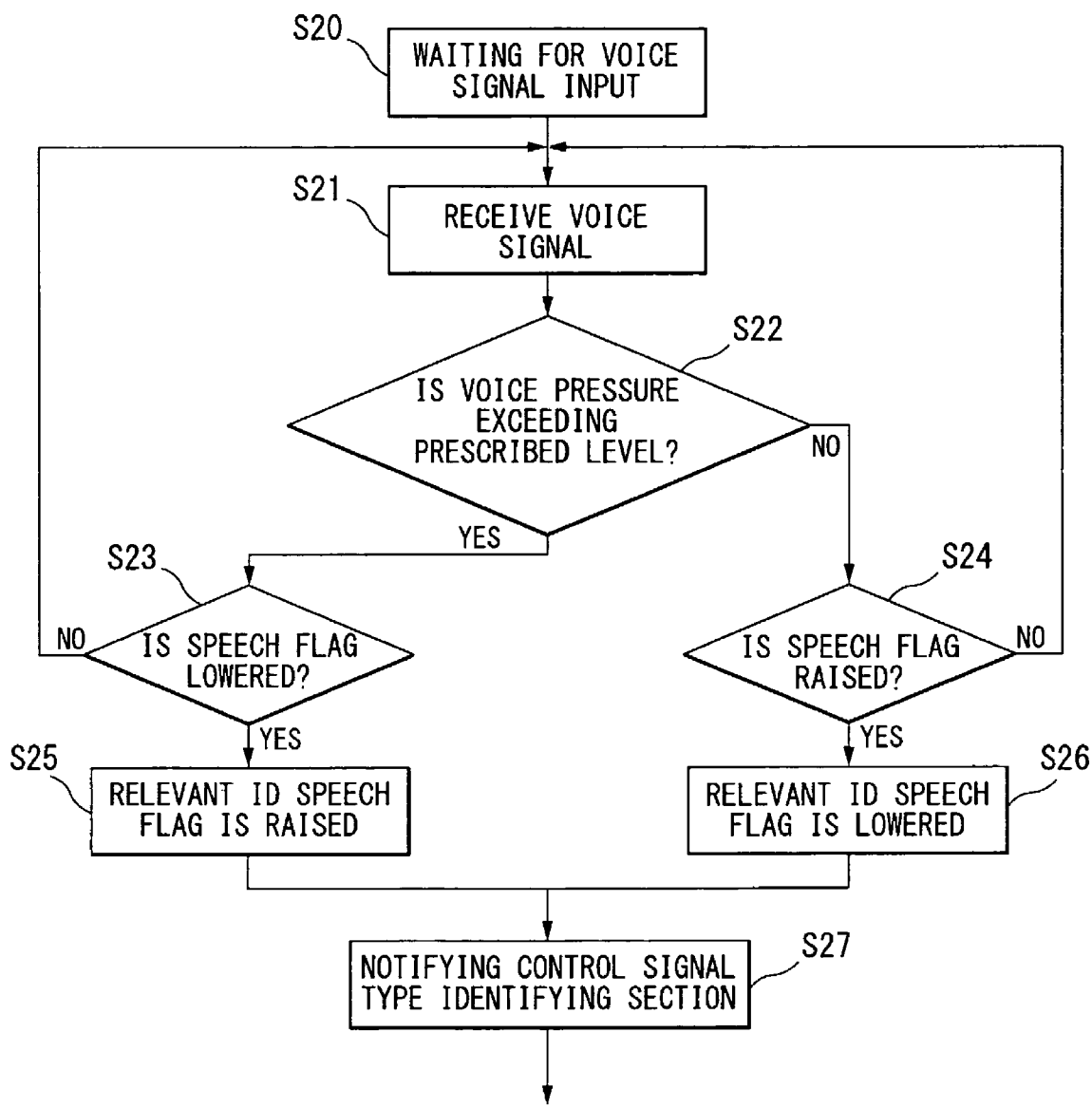
FIG. 9 is a flowchart showing the process of judging the voice pressure level of a voice control signal.
Figure 10:
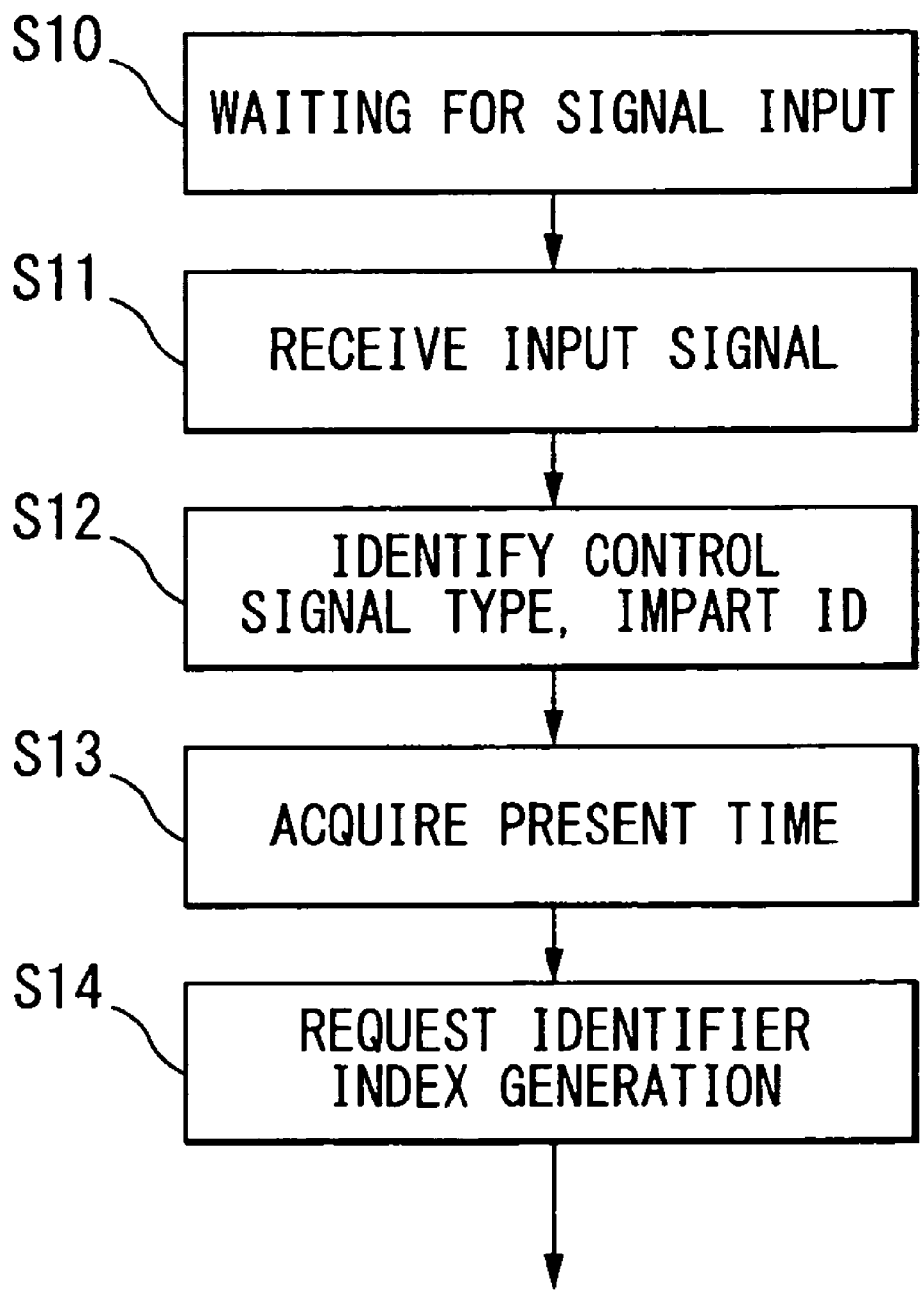
FIG. 10 is a flowchart showing the process of detecting a voice control signal and requesting metadata generation.

FIG. 9 is a flowchart showing the flow from the detection of the voice pressure level of a voice control signal input into a pin microphone until the voice control signal which has reached a certain voice pressure level is sent to the control signal type identifying section 121, and FIG. 10 is a flowchart showing the flow from the sending of the voice control signal to the control signal type identifying section 121 until the generation of metadata is requested. The flow of metadata generation processing is explained on the basis of the flowcharts shown in FIGS. 9 and 10. When the recording of a program starts, a voice control signal from a pin microphone is input into the microphone signal voice pressure level judging section 123 of the control signal detecting section 12 via the voice selecting switch 18 every time a speech is made (S20 and S21).

In the microphone signal voice pressure level judging section 123, noise and the like are not regarded as speech and only a voice control signal which has reached a certain voice pressure level or higher is regarded as a speech and then the voice control signal is input into the control signal type identifying section 121. In contrast, a voice control signal which does not reach a certain voice pressure level or higher is regarded as no speech being made or a speech being finished and thus the voice control signal is not input into the control signal type identifying section 121 or the finish of the speech is notified.

More specifically whether or not the voice pressure level of an input voice control signal exceeds a prescribed value is judged (S22). When the voice pressure level exceeds the prescribed value, a speech flag (internal flag to judge whether or not a speaker has already started a speech) is confirmed (S23). And when the speech flag is lowered, the speech flag of the relevant signal ID is raised (S25), the voice control signal is input into the control signal type identifying section 121, and the fact that the speech is started is notified (S27). In the same way, when the voice pressure level of a voice control signal input when the speech flag is raised is lower than a prescribed value, the speech flag is lowered (S24), the voice control signal is input into the control signal type identifying section 121, and the fact that the speech has been finished is notified (S27). In this case, it has been explained that, in order to detect the start or finish of a speech, only when a voice pressure level exceeds or is lower than a prescribed level, the fact is notified to the control signal type identifying section 121. However, it is also possible to judge that a speech has been made only when a voice pressure level is attained continuously for a certain period of time, and send the voice control signal to the control signal type identifying section 121. Further, it is also possible to send a voice control signal to the control signal type identifying section 121 only when a voice pressure level is lower than a prescribed value continuously for a certain period of time.

When a voice control signal is input into the control signal type identifying section 121, the control signal type identifying section 121 extracts the header part thereof, sends it to the control signal type managing section 122, and inquires the type and the identifier corresponding to the voice control signal. The control signal type managing section 122 identifies the type and the identifier of the voice control signal on the basis of the signal type information and the signal identifier shown in the header part 200, and notifies the control signal type identifying section 121 of the type and the identifier. In this case, if the type can be identified only from the identifier (refer to FIG. 6), it is possible to notify only of the identifier (S12).

The control signal type identifying section 121, following the acquisition of a type and an identifier, sends the type and the identifier to the index generation requesting section 124, and, following that, the index generation requesting section 124 inquires the present time from the time obtaining section 125 and obtains the time (S13). The index generation requesting section 124, following the acquisition of the type, the identifier, and the time of a voice control signal, sends them to the index generating section 13 and requests to generate an index (metadata) (S14).

The index generating section 13 generates metadata following the acquisition of a type, an identifier, and time from the control signal detecting section 12 (the index generation requesting section 124), and in the meantime, sends the type and the identifier to the control signal attribute information managing section 14 and inquires the attribute information. The control signal attribute information managing section 14 obtains the attribute information which is managed in a tied manner on the basis of the sent type and identifier, and sends the attribute information to the index generating section 13. The index generating section 13 imparts the attribute information to the generated metadata following the notification of the attribute information. By carrying out the above processing every time the control signal detecting section 12 detects a voice control signal, it is possible to generate metadata wherein the start time and the finish time of speech of a performer who puts on a pin microphone are sorted for each performer.

Figure 11:
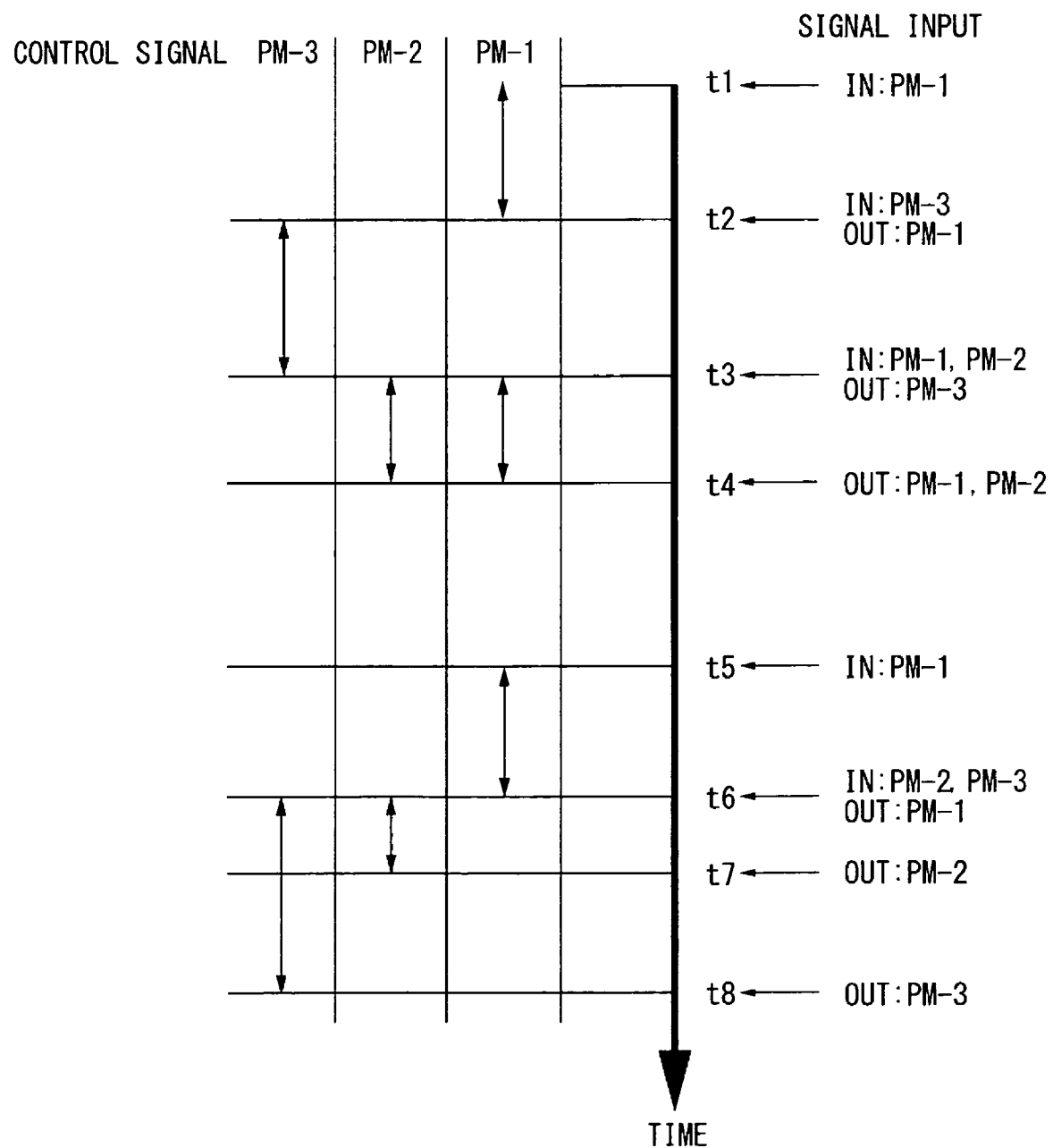
FIG. 11 is a diagram schematically showing various kinds of pin microphones and the start time and end time when each of the pin microphones is used.

FIG. 11 is a diagram schematically showing the relationship between the type and the identifier of a control signal generated at the index generating section 13 and the attribute information thereof. For example, the diagram shows that voice signals from the signal ID PM-1 of a control signal are detected at the time periods between t1 and t2, t3 and t4, and t5 and t6, and a speaker at a certain time zone can be specified. FIG. 12 shows an example of expressing the above processing results in the form of XML (extensible Markup Language) and the start time and the finish time of speech of a speaker can be recognized at a glance.

As stated above, the control signal detecting section detects a voice control signal which controls a voice simultaneously with the start of speech of a program performer and thereby it is possible to generate metadata from the information on the timing of the speech and the identity of the performer automatically and accurately. Further, by imparting also the attribute information, significant cost reduction can be attained in comparison with the manual metadata generation which has conventionally been adopted.

Further, another idea is to specify the content of speech by applying not only the identification of a speaker and the time of speech but also a voice recognition technology to a voice signal from a pin microphone. In this case, it is also possible to impart information about the content of speech by adding the voice recognition result to a speaker identifying information XML shown in FIG. 12.

<A Case where the Control Signal of a VCR is Detected>

Next, the generation of metadata when a VCR is used is explained. In a live broadcast program typified by a news program, there are many cases where an edited VCR picture is broadcast as a feature or a topic. A VCR is edited at and output from the editing PC 41.

Further, the control signals, the types, and the identifiers of various kinds of devices are registered in the control signal type managing section 122 of the control signal detecting section 12 before the system is operated. That is, when a VCR is selected with the VCR controller 40 during the broadcast of a program, the control signal detecting section 12 detects the VCR control signal output from the VCR selecting switch 16 and further the control signal, the type, and the identifier of the VCR are registered beforehand so as to be able to identify the VCR of the input. Further, it is assumed that a VCR records also the title, the content, the shooting place, the time, and others at the time of editing. Such attribute information is registered also in the control signal attribute information managing section 14 and the attribute information (the title in this case) and the identifier are managed in a tied manner in order to identify the relevant VCR. Here, the attribute information and the identifier registered in the control signal attribute information managing section 14 can also be registered by on-line connection from the editing PC 41. Thereby, the attribute information and the identifier generated around the same time as the VCR editing are automatically registered as they are in the control signal attribute information managing section 14. Further, instead of on-line registration, it is also possible to record attribute information and an identifier in a removable medium such as a CD-ROM, a flexible disk, a DVD, an SD memory card and the like, and register them in the control signal attribute information managing section 14 with the removable medium.

FIG. 13 shows the relationship between a VCR identifier and a VCR title registered in the attribute information database 143 of the control signal attribute information managing section 14, and it is assumed that the identifier and the title of a VCR are managed and registered in a set. In FIG. 13, VCR-1, VCR-2, and VCR-3, which are the identifiers of the VCRs, are managed in the state of being tied to the titles of the shot pictures; "burned body case follow-up story," "Nagata-cho on the eve of dismissal," and "Sports feature picture," respectively. Here, with regard to the attribute information registered in the attribute information database 143, in addition to the title of a VCR, information on the content, the time, the shooting place, the performers, the recording time, and others of a VCR may be managed in a tied manner.

During the broadcast of a program, an assigned VCR is broadcast with the VCR controller 40 by operating the VCR selecting switch 16 in an editorial room, and at the same time a VCR control signal is input into the control signal type identifying section 121 of the control signal detecting section 12. When a VCR control signal is input into the control signal type identifying section 121, in accordance with the processing flow shown in FIG. 10, the control signal type identifying section 121 extracts the header part thereof, sends it to the control signal type managing section 122, and inquires the type and the identifier corresponding to the VCR control signal. The control signal type managing section 122 identifies the type and the identifier of the VCR control signal on the basis of the signal type information and the signal identifier shown in the header part 200, and notifies the control signal type identifying section 121 of the type and the identifier. In this case here, if the type can be identified from only the identifier (refer to FIG. 6), it is possible to notify only of the identifier.

The control signal type identifying section 121, following the acquisition of a type and an identifier, sends the type and the identifier to the index generation requesting section 124, and, following that, the index generation requesting section 124 inquires the present time from the time obtaining section 125 and obtains the time. The index generation requesting section 124, following the acquisition of the type, the identifier, and the time of a voice control signal, sends them to the index generating section 13 and requests to generate an index (metadata).

The index generating section 13 generates metadata following the acquisition of a type, an identifier, and time from the control signal detecting section 12 (the index generation requesting section 124), and in the meantime, sends the type and the identifier to the control signal attribute information managing section 14 and inquires the attribute information. The control signal attribute information managing section 14 obtains the attribute information which is managed in a tied manner on the basis of the sent type and identifier, and notifies the index generating section 13 of the attribute information. The index generating section 13 imparts the attribute information to the generated metadata following the notification of the attribute information.

By carrying out the above processing every time the control signal detecting section 12 detects a VCR control signal output from the editing switch 19 simultaneously with the control of the VCR, it is possible to generate metadata wherein the time when the VCR is used is sorted for each VCR and impart the attribute information. FIG. 14 shows an example of expressing the above processing results in the form of XML and the time when the VCR is broadcast and the title of the VCR can be recognized at a glance.

As stated above, it is possible to generate metadata automatically and accurately from information on the time when a VCR is used by detecting a VCR control signal with the control signal detecting section simultaneously with the use of the VCR, and further it is possible to considerably reduce man-hours by imparting also the attribute information in comparison with the conventional manual metadata generation.

<A Case where the Control Signal of a Telop is Detected>

Next, the generation of metadata when a telop is used is explained. In the broadcasting of a program, there are many cases where telops such as the name of a person, date and time, a location, contents, and others are used to assist the explanation on a screen. A telop such as a telop document processing tool is created and output with a telop creator 51, to carry out electronic processing.

Further, the control signals, the types, and the identifiers of various kinds of devices are registered in the control signal type managing section 122 of the control signal detecting section 12 before the system is operated. That is, when a telop is used with the telop generator 50 during the broadcast of a program, the control signal detecting section 12 detects the telop control signal output from the telop selecting switch 17 and further the control signal, the type, and the identifier of the telop are registered beforehand so as to be able to identify the telop of the input. Further, it is assumed that a telop records also information including the character string, the type of the character string, the font, the character style, the color, and others at the time of creating. Such attribute information is registered also in the control signal attribute information managing section 14 and the attribute information (the character string in this case) and the identifier are managed in a tied manner in order to identify the relevant telop. Here, the attribute information and the identifier registered in the control signal attribute information managing section 14 can also be registered by on-line connection from the telop creator 51. Thereby, the attribute information and the identifier generated around the same time as the telop creating are automatically registered as they are in the control signal attribute information managing section 14. Further, instead of on-line connection, it is also possible to record attribute information and an identifier in a removable medium such as a CD-ROM, a flexible disk, a DVD, an SD memory card and the like, and register them in the control signal attribute information managing section 14 with the removable medium.

FIG. 15 shows the relationship between a telop identifier and a telop character string registered in the attribute information database 143 of the control signal attribute information managing section 14 and it is assumed that the identifier and the character string of a telop are managed and registered in a set. In FIG. 15, TP-1, TP-2, TP-3, and TP-4, which are the identifiers of the telops, are managed in the state of tied to the character strings of the created telops and the types; "Taro Yamada, personal name," "Jiro Sato, personal name," "burned body case follow-up story, topic name," and "Nagata-cho on the eve of dismissal, topic name," respectively. Here, with regard to the attribute information registered in the attribute information database 143, in addition to the character string of a telop and the type thereof, information on the font, the character style, the color of a telop, and others may be managed in a tied manner.

During the broadcast of a program, an assigned telop is broadcast with the telop generator 50 by operating the telop selecting switch 17 in an editorial room, and at the same time a telop control signal is input into the control signal type identifying section 121 of the control signal detecting section 12. When a telop control signal is input into the control signal type identifying section 121, in accordance with the processing flow shown in FIG. 10, the control signal type identifying section 121 extracts the header part thereof, sends it to the control signal type managing section 122, and inquires the type and the identifier corresponding to the telop control signal. The control signal type managing section 122 identifies the type and the identifier of the telop control signal on the basis of the signal type information and the signal identifier shown in the header part 200, and notifies the control signal type identifying section 121 of the type and the identifier. In this case here, if the type can be identified from only the identifier (refer to FIG. 6), it is possible to notify only of the identifier.

The control signal type identifying section 121, following the acquisition of a type and an identifier, sends the type and the identifier to the index generation requesting section 124, and, following that, the index generation requesting section 124 inquires the present time from the time obtaining section 125 and obtains the time. The index generation requesting section 124, following the acquisition of the type, the identifier, and the time of a voice control signal, sends them to the index generating section 13 and requests to generate an index (metadata).

The index generating section 13 generates metadata following the acquisition of a type, an identifier, and time from the control signal detecting section 12 (the index generation requesting section 124), and in the meantime, sends the type and the identifier to the control signal attribute information managing section 14 and inquires the attribute information. The control signal attribute information managing section 14 obtains the attribute information which is managed in a tied manner on the basis of the sent type and identifier; and notifies the index generating section 13 of the attribute information. The index generating section 13 imparts the attribute information to the generated metadata following the notification of the attribute information.

By carrying out the above processing every time the control signal detecting section 12 detects a telop control signal output from the editing switch 19 simultaneously with the control of the telop, it is possible to generate metadata wherein the time when the telop is used is sorted for each telop and impart the attribute information. FIG. 16 shows an example of expressing the above processing results in the form of XML and the time when the telop is broadcast and the identity of the telop can be recognized from the XML at a glance.

As stated above, it is possible to generate metadata automatically and accurately from information on the time when a telop is used by detecting a telop control signal with the control signal detecting section simultaneously with the use of the telop, and further it is possible to considerably reduce man-hours by imparting also the attribute information in comparison with the conventional manual metadata generation. Although false recognition has occurred and wrong metadata has been imparted since information has been obtained by recognizing the character string itself of a telop in the case of a conventional metadata generating technology of using a telop, it never happens that wrong metadata is imparted in the case of the present invention.

<A Case where the Control Signal of a Camera is Detected>

Next, the generation of metadata when a studio camera is used is explained. A program is broadcast by using a large number of cameras placed in a studio, and shooting objects while switching the cameras. The studio cameras 30 are switched with the camera selecting switch 15 and, at the same time with this, the camera selecting switch 15 sends a camera control signal to the control signal detecting section 12.

Further, the control signals, the types, and the identifiers of various kinds of devices are registered in the control signal type managing section 122 of the control signal detecting section 12 before the system is operated. That is, when a camera control signal to switch a camera is sent, the control signal detecting section 12 detects that the camera is switched and further the control signal, the type, and the identifier of the camera are registered beforehand so as to be able to identify the switched camera. By detecting a camera control signal with the control signal detecting section 12 simultaneously with the switching of a camera, it is possible to generate metadata automatically and accurately from camera work information on a used camera. Further, by detecting a camera control signal changed when a screen is switched from a relay picture to a studio picture, it is also possible to generate metadata from inserted information of the relay picture.

In addition to those, by attaching an RF tag (radio frequency tag) to a program performer and disposing a reader to read a signal from the RF tag to a camera 30, it is possible to identify a performer currently appearing on a screen and generate metadata from the information. In this case, the signal, the type, and the identifier of the RF tag are registered before the system is operated in the control signal type managing section 122 of the control signal detecting section 12, and the identifier of the RF tag and the name, the date of birth, and others of a main performer which are used as attribute information on the performer to whom the RF tag is attached are registered in the attribute information database 143 of the control signal attribute information managing section 14 in a tied manner.

Further, not by independently using such various kinds of control signals, but by detecting two or more control signals simultaneously with the control signal detecting section 12, it is possible to generate metadata automatically and accurately from information on the time of the use of the various kinds of devices and further, by imparting the attribute information too, it is possible to generate metadata from a variety of information composing the program broadcast synchronously during the broadcasting of the program, and resultantly the effects of considerably reducing conventional manual metadata generating work and imparting accurate information can be obtained.

<A Case where an External Database is Used>

Figure 17:
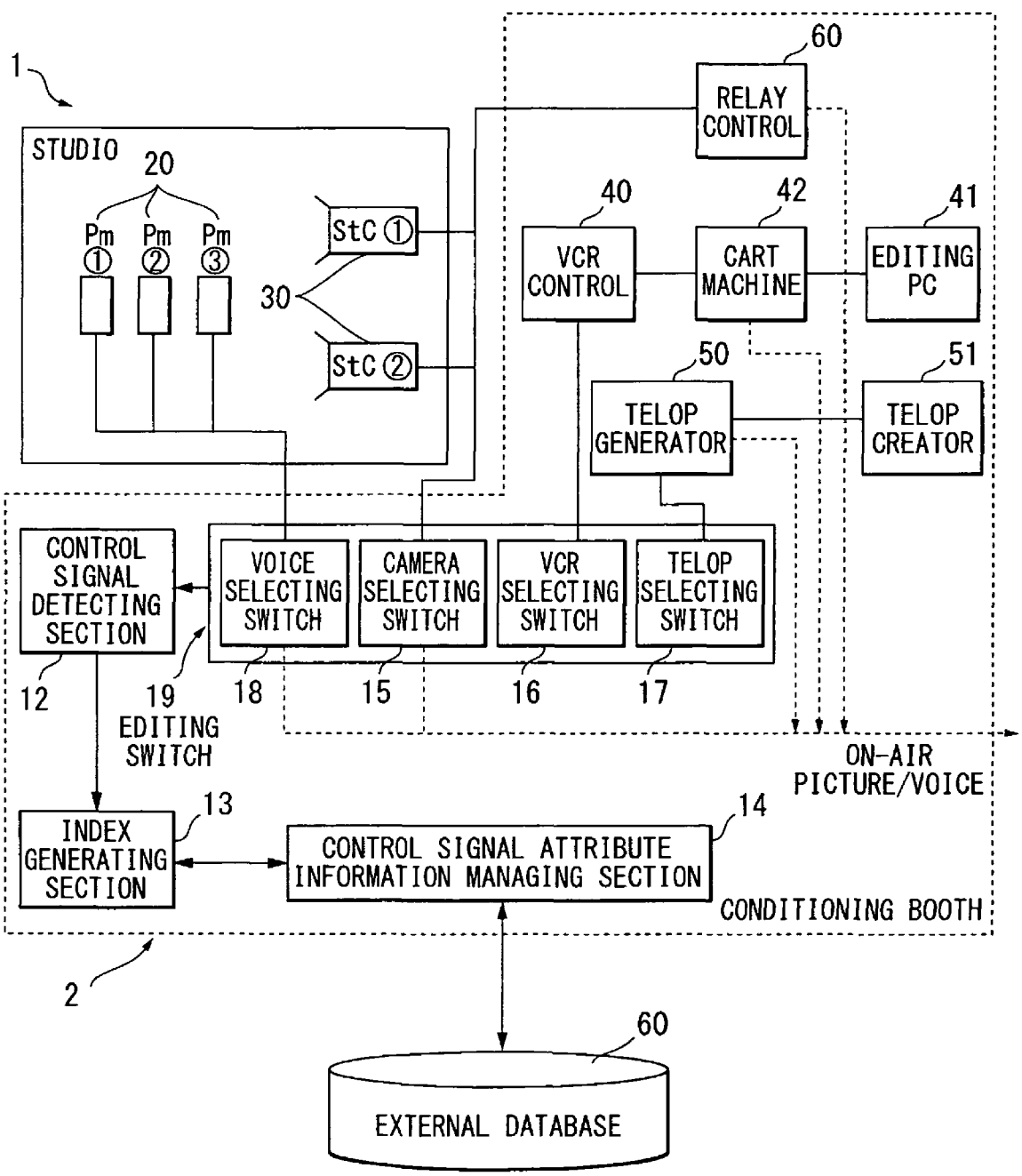
FIG. 17 is a block diagram showing an index imparting system when an external database is used.
Figure 18:
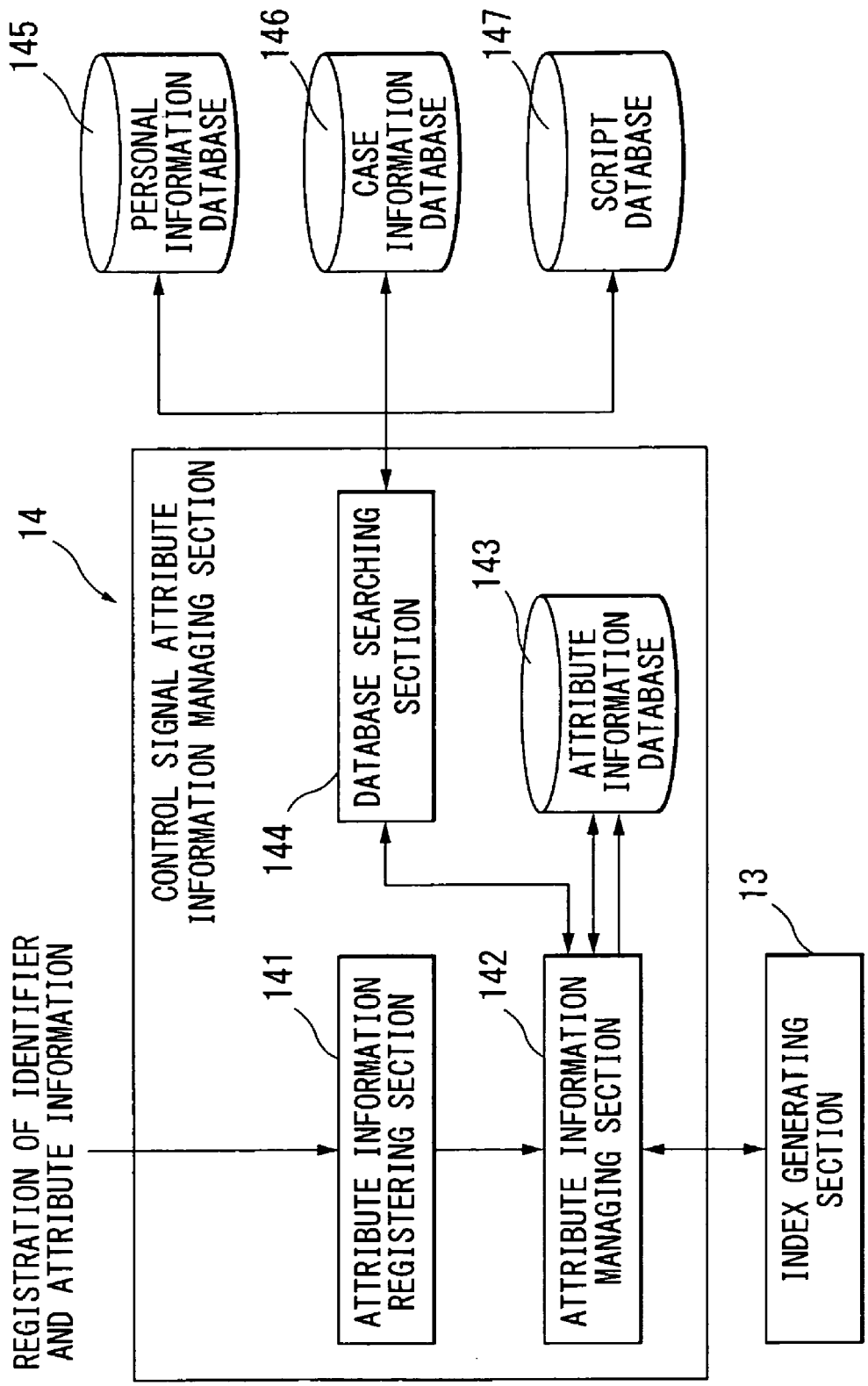
FIG. 18 is a block diagram showing an internal configuration of a control signal attribute information managing section when external databases are used.

Further, as shown in FIGS. 17 and 18, it is possible for the control signal attribute information managing section 14 to include a database searching section 144 connected to a database storing detailed information of attribute information, and automatically impart the detailed information obtained from the database 70 to metadata generated at the index generating section 13. In the present embodiment, the database 70 is provided with a personal information database 71, a news database 72, and a script database 73, and those are connected online. As shown in FIG. 19, in the personal information database 71, a personal name, a gender, a date of birth, a hometown, and others are managed in a tied manner. Further, in the news database 72, picture information, contents, a shooting space, and others are managed in a tied manner. Furthermore, in the script database 73, character string information, picture information, a performer, and others are managed in a tied manner.

Figure 20:
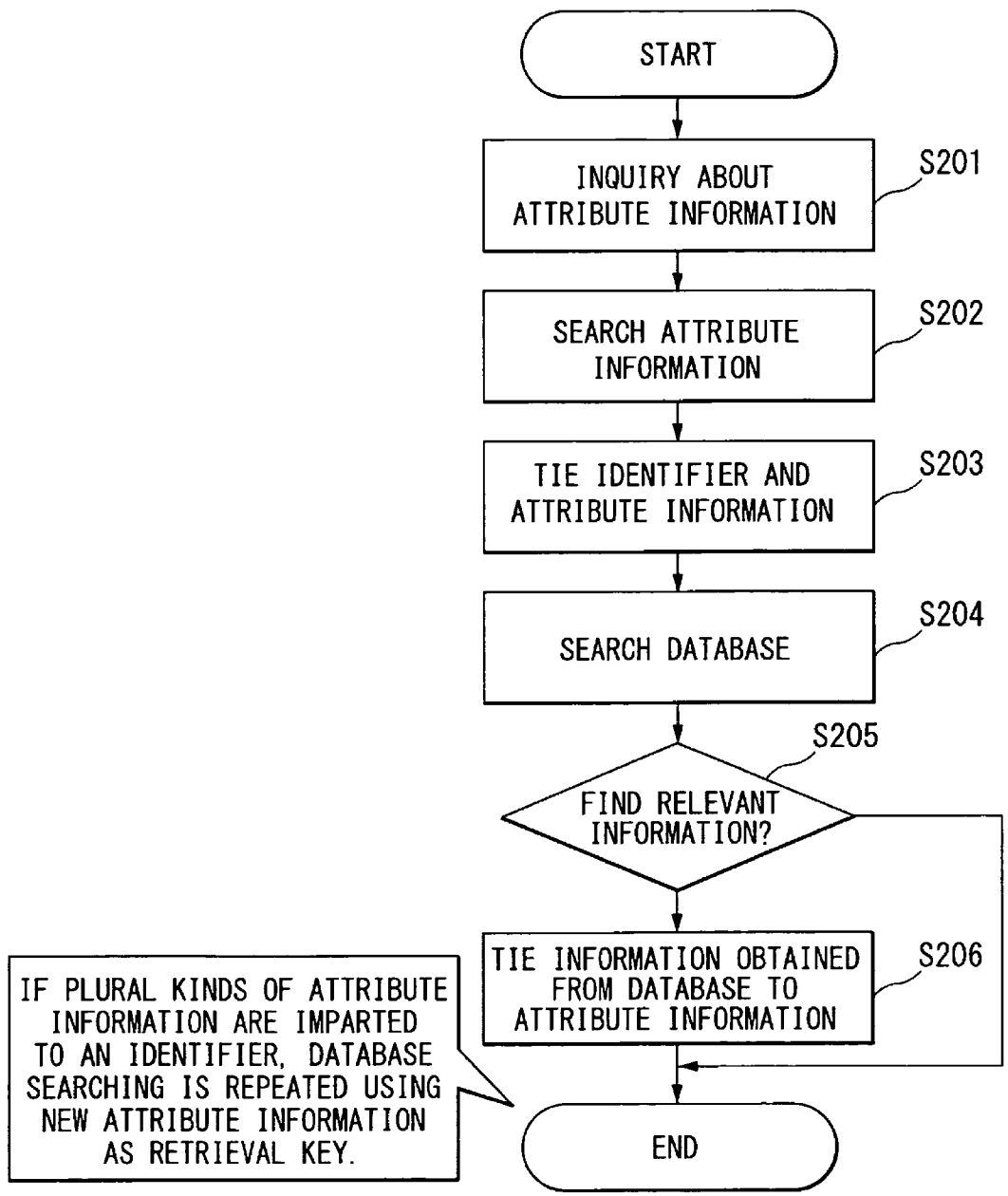
FIG. 20 is a flowchart showing a process of obtaining information tied to attribute information from various kinds of external databases.

Processing procedures up to metadata generation are explained hereunder with FIG. 20. In the control signal attribute information managing section 14, following the acquisition of the identifiers of various kinds of devices sent from the index generating section 13 by the attribute information managing section 142, the attribute information managing section 142 inquires of the attribute information database 143 whether or not attributed information tied to an identifier exists (S201). The attribute information database 143 searches attribute information tied to the identifier (S202) and notifies the attribute information managing section 142 of the attribute information. The attribute information managing section 142 ties the notified attribute information to the identifier (S203) and meanwhile sends the attribute information to the database searching section 144. The database searching section 144 inquires of the personal information database 71, the news database 72, and the script database 73 whether or not detailed information of the attribute information exists (S204). Here, it is also possible to inquire the existence of the databases selectively. The databases 71 to 73 search detailed information tied to the attribute information and notify the attribute information managing section 142 through the database searching section 144 of the detailed information. The attribute information managing section 142 ties the attribute information obtained from the attribute information database 143 to the detailed information obtained from the databases 71 to 73 and notifies the index generating section 13 (S206).

Although the above processing is based on the case of searching for detailed information on attribute information tied to single identifier, when plural attribute information pieces exist in plurality, detailed information is searched for by using new attribute information as a retrieval key. Then, the control signal attribute information managing section 14 sends detailed information searched for on the basis of the attribute information together with the attribute information to the index generating section 13, and then the index generating section 13 imparts the notified attribute information and detailed information to generated metadata. FIGS. 21 and 22 show examples of metadata to which attribute information and detailed information are imparted.

As stated above, the control signal attribute information managing section is provided with the database searching section 144 to search for the detailed information of attribute information managed by the control signal attribute information managing section, and thereby, with regard to attribute information obtained on the basis of an identifier, the control signal attribute information managing section can obtain the detailed information thereof from the external databases 71 to 73 and impart the detailed information to metadata. Since detailed information can be obtained on the basis of attribute information tied to an identifier, the amount of attribute information managed by the control signal attribute information managing section 14 can be reduced to the minimum.

As stated above, in the present embodiment, the situation of various kinds of devices used in program broadcasting is configured so that the control signal detecting section detects control signals of those devices, identifies the types and the identifiers thereof, and obtains the times. Then metadata is automatically generated following the acquisition of the types, the identifiers, and the times by the index generating section. Further, it is configured so that the index generating section requests attribute information tied to an identified identifier from the control signal attribute information managing section wherein the identifiers of various kinds of control signals and the attribute information thereof are managed in a tied manner, obtains the attribute information and automatically imparts the attribute information to metadata. That is, in the present embodiment, it is possible to automatically generate metadata showing a variety of information composing program broadcast in synchronization during the broadcasting of a program and thus the effects of considerably reducing conventional manual metadata generating work and imparting accurate information can be obtained. Further, since it is also possible to obtain detailed information from another database on the basis of attribute information tied to an identifier and impart it to metadata, it is possible to automatically generate metadata containing accurate detailed information and affluent information by obtaining detailed information using the attribute information as the retrieval key even in the case of a small amount of attribute information.

Embodiment 2

Figure 23:
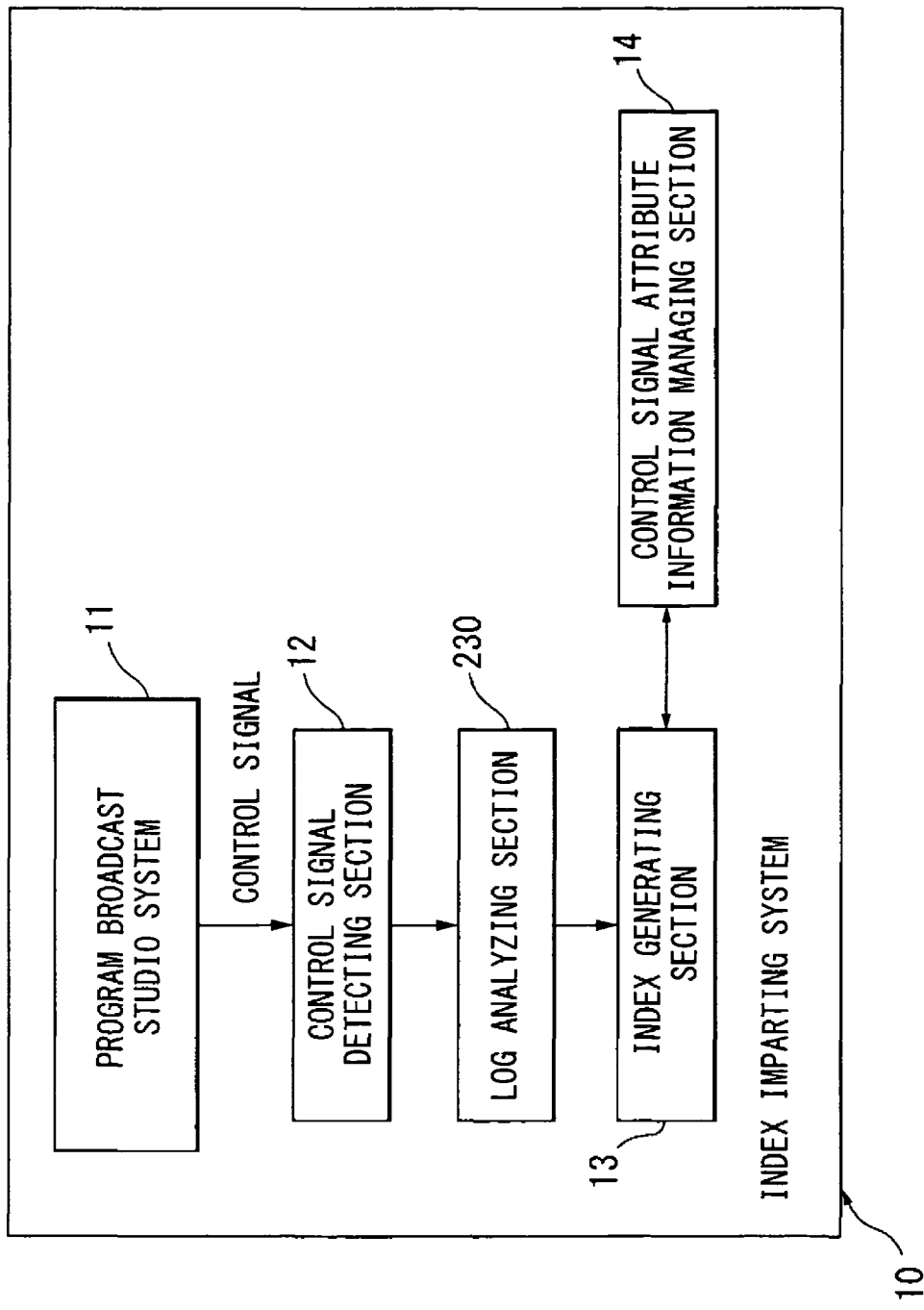
FIG. 23 is a block diagram showing a general configuration of an index imparting system according to an embodiment of the present invention (Embodiment 2)
Figure 24:
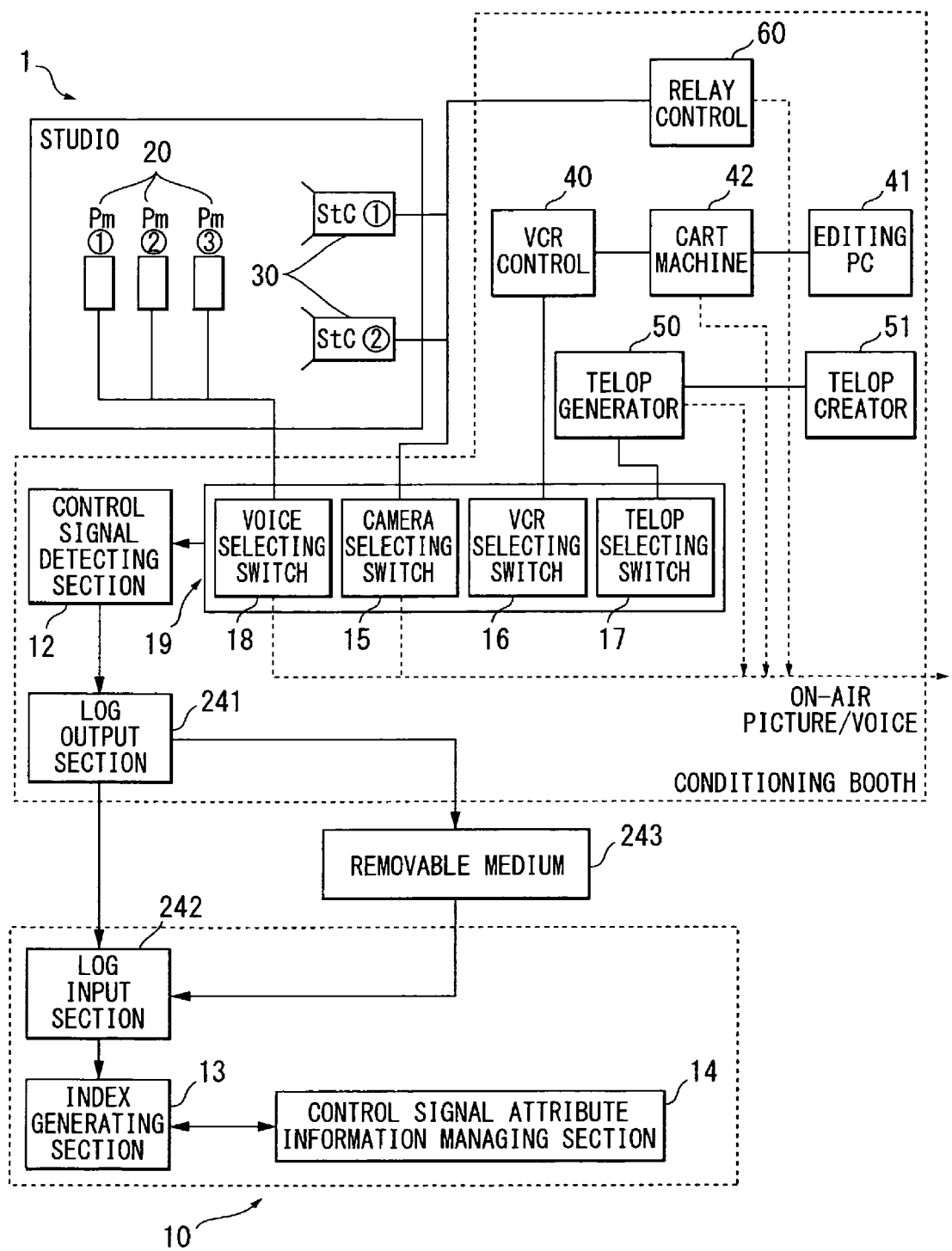
FIG. 24 is a block diagram showing a system operation type of an index imparting system used in a broadcast station (Embodiment 2)
Figure 25:
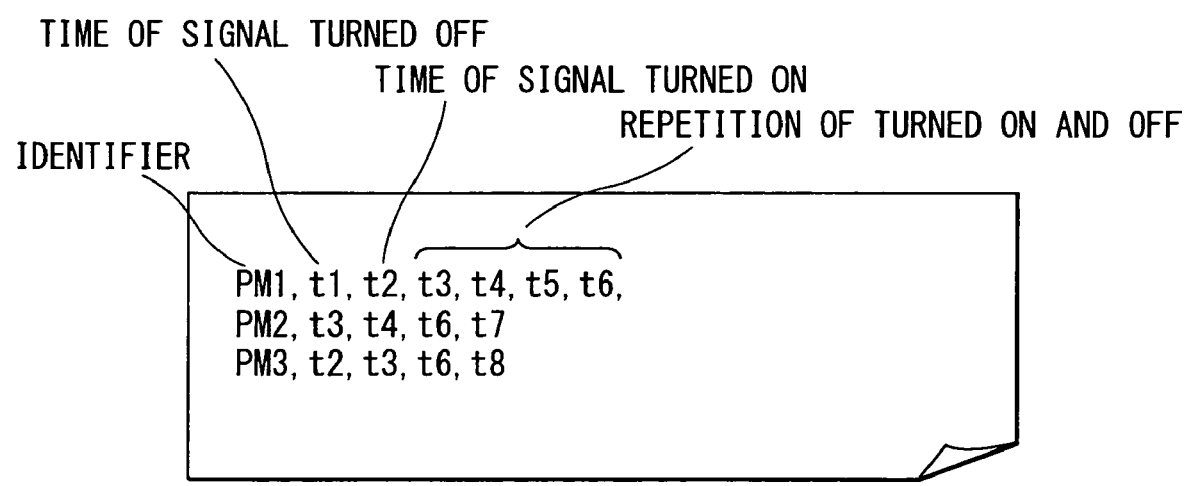
FIG. 25 is a view showing log data generated following the acquisition of the type, the identifier, and the time of each of various kinds of control signals (pin microphone).

The second embodiment according to the present invention is hereunder explained. In Embodiment 1, metadata is automatically generated in synchronization during the broadcasting of a program with regard to a variety of information composing the program broadcast. However, the features of the present embodiment are to output log data as intermediate data and to generate metadata by inputting the log data asynchronously during the broadcasting of a program. FIG. 23 shows the configuration of a main block of an index imparting system according to an embodiment of the present invention. The same components as those in the index imparting system shown in FIG. 1 are represented by the same reference numerals, and duplication of explanations is avoided. The difference in configuration from the system shown in FIG. 1 is that the system of this case is provided with a log analyzing section 230. The log analyzing section 230 plays the role of generating and outputting log data following the acquisition of the type, the identifier, and the time of a control signal coming from the control signal detecting section 12. As shown in FIG. 25, log data is data produced by sorting time for each identifier. Further, as shown in FIG. 24, the log analyzing section includes a log output section 241 to generate log data and output the log data to a network or a removable medium 243; and a log input section 242 to input and send the log data to the index generating section 13. Here, the network cited here is thought to be online connected, and the removable medium 243 is thought to be a recording medium such as a CD-ROM, a flexible disk, a DVD, an SD memory card and the like. Further, the log analyzing section 230 does not need the intervention of a network or a recording medium, and may merely be a block which generates log data wherein time is sorted for each identifier and outputs the log data or may be physically integrated into one unit.

The log output section 241 of the log analyzing section 230 sorts time for each identifier and generates log data following the acquisition of the identifier and the detection time of a control signal coming from the control signal detecting section 12 (refer to FIG. 25). The log data shown in the figure is produced by logging the control signal of a pin microphone for each identifier. The pin microphone recognizes the start time and the finish time of a speech and hence the times shown here are shown in the state where the start and finish of a speech by a performer are repeated.

The generated log data is input into the log input section 242 from the log output section 241 through a network or a removable medium 243 and the log input section 242 sends the log data to the index generating section 13. The index generating section 13 generates such metadata as shown in FIG. 12 following the acquisition of the log data wherein time is sorted for each identifier by the index generating section 13. Since time is sorted for each identifier in the log data, it is possible to generate metadata collectively.

Meanwhile, the index generating section 13 uses an identifier shown in log data and thereby inquires attribute information managed in a tied manner from the control signal attribute information managing section 14. The control signal attribute information managing section 14, when it receives an identifier from the index generating section 13, obtains the tied attribute information and notifies the index generating section 13 of the attribute information, and thereby the index generating section 13 imparts the attribute information to generated metadata.

Note that, although log data generated when a pin microphone control signal is detected have been explained as an example in the present embodiment, even in the case of detecting the control signal of a VCR, a telop, a camera, or an RF tag as explained in Embodiment 1, it is possible to generate log data likewise and generate such metadata as shown in FIGS. 14 and 16 in the same way as Embodiment 1.

Further, it is also possible that, by using attribute information obtained from an identifier shown in log data as a retrieval key, the control signal attribute information managing section 14 is configured so as to access the personal information database 71, the news database 72, and the script database 73 from the database searching section 144 and obtain detailed information. In this case, such metadata as shown in FIGS. 21 and 22 are generated in the same way as Embodiment 1.

As stated above, in the present embodiment, the situation of various kinds of devices used in program broadcasting is configured so as to detect control signals of those devices, identify the types and the identifiers thereof, obtain the times, and when the log analyzing section obtains those, generate log data wherein the time is sorted for each identifier. Then the index generating section is configured so as to automatically generate metadata following the acquisition of generated log data by the index generating section. Further, the index generating section is configured so as to request and obtain attribute information tied to an identified identifier from the control signal attribute information managing section wherein the identifiers of various kinds of control signals and the attribute information thereof are managed in a tied manner, and automatically impart the attribute information to metadata. That is, in the present embodiment, by using the type, the identifier, and the time of an identified control signal and generating log data wherein the time is sorted for each identifier, it is possible to realize the automatic generation of metadata from a variety of information composing program broadcast at an arbitrary timing even asynchronously during the shooting of the program, for example, in the case where metadata is generated from log data after the completion of editing work of a recorded picture in the recording of the program picture, and the effects of considerably reducing conventional manual metadata generating work and imparting accurate information can be obtained.

As explained above in detail, in program broadcast at a broadcast station, by setting various kinds of control signals used during the broadcasting and information attribute to the signals as attribute information beforehand, it is possible to automatically generate metadata by using the detection of a control signal as the trigger. Further, it is possible to carry out accurate indexing and obtain the effect of avoiding the trouble of manual reconditioning work. Furthermore, by online connection to a VCR editing device, a telop creating device and the like, it is also possible to simplify preliminary manual setting of attribute information.

What is claimed is:

1. An index imparting system which generates metadata based on signals in a broadcast station, the system comprising:
    a processor;
    a memory coupled to the processor to store a database, wherein the database comprises (i) an identifier for uniquely specifying each of the control signals of various kinds of devices and (ii) an attribute information which describes the data recorded or reproduced by the device and is information relevant to each user of the various kinds of devices or each of the various kinds of devices;
    a control signal detecting section to (1) identify the device which generates a control signal based on recording or reproduction of data, the device is identified based on a type and an identifier that uniquely identifies the device, and (2) identify a time of a detection of the control signal;
    a control signal attribute information managing section to manage the identifier and corresponding attribute information of the control signal, wherein the control signal attribute information managing section includes a database searching section connected to the database which stores detailed information of attribute information and automatically imparts the detailed information obtained from the database to metadata generated at the index generating section; and
    an index generating section to automatically generate metadata following an acquisition of a type, the identifier, and the time identified at the control signal at the control signal detecting section and the corresponding attribute information at the control signal attribute information managing section; and
    a log analyzing section for:
        a) generating log data indicating start and finish times for the control signal, the start and finish times being determined based on the identified time of detection for the control signal, and
        b) outputting the log data to the index generating section.

2. The index imparting system according to claim 1, wherein the log analyzing section comprises:
    a log output section to output the log data to the index generating section via the network or the removable medium.

3. The index imparting system according to claim 1, wherein the index imparting system detects an input control signal of any of a microphone, a VCR, or a telop, generates metadata following the acquisition of the type, the identifier, and the time of detection thereof, and imparts attribute information relevant to the control signal to the metadata.

4. The index imparting system according to claim 1, wherein the control signal detecting section comprises:
    a control signal type identifying section to detect an input control signal and to identify the type and the identifier thereof;
    a control signal type managing section to manage the input control signal and the type and the identifier thereof;
    a time obtaining section to obtain a time when the input control signal is detected; and
    an index generation requesting section to send the identified type and identifier and the obtained time to the index generating section and to request to generate the metadata.

5. The index imparting system according to claim 1, wherein the microphone signal voice pressure level judging section judges a measured voice pressure level, judges that the voice is generated only when the voice pressure level is continuously maintained for a prescribed period of time and sends a voice control signal to the control signal type identifying section.

6. The index imparting system according to claim 1, wherein the control signal attribute information managing section comprises:
    the database which is further configured to store an identifier for uniquely specifying each of the control signals of various kinds of devices and the attribute information which is information relevant to each user of the various kinds of devices or each of the various kinds of devices;
    an attribute information managing section to obtain the attribute information from the database in response to a request from the index generating section for the attribute information; and
    an attribute information registering section to receive registration of the identifier and attribute information stored in the database.

7. The index imparting system according to claim 6, wherein the database stores the detailed information on at least any one of a person, news, or a script.

8. The index imparting system according to claim 6, wherein the attribute information registering section is connected online to a device to edit a VCR or a telop, and attribute information which is registered to the attribute information registering section is obtained by registering online information obtained or input by using the editing device.

9. The index imparting system according to claim 6, wherein attribute information which is registered to the attribute information registering section is obtained by storing information obtained or input by using a device to edit a VCR or a telop in a removable medium as the attribute information, and registering the information by using the removable medium.

10. The index imparting system according to claim 1, wherein the control signal detecting section identifies a time on which detection of the control signals starts as a start time, identifies a time on which detection of the control signals are finished as an end time, and then adds a time zone information between the start time and the end time to the metadata as an attribute information of the control signals.

11. An index imparting system, comprising:
    a processor;
    a memory coupled to the processor to store a database, wherein the database comprises (i) an identifier for uniquely specifying each of the control signals of various kinds of devices and (ii) an attribute information which describes the data recorded or reproduced by the device and is information relevant to each user of the various kinds of devices or each of the various kinds of devices;
    a control signal detecting section to (1) identify a microphone, the microphone generates a voice control signal in response to recording a voice of a performer, the microphone being identified by an identifier in the voice control signal that uniquely identifies the microphone, and to (2) identify a time of a detection of the voice control signal;
    a control signal attribute information managing section to manage the identifier and corresponding attribute information of the voice control signal, and to identify the attribute information of the voice control signal stored in the database, the voice control signal associated with the performer, the attribute information of the voice control signal identified depending on the microphone identifier obtained at the control signal detecting section, wherein the control signal attribute information managing section includes a database searching section connected to the database which stores detailed information of attribute information and automatically imparts the detailed information obtained from the database to metadata generated at the index generating section;
    an index generating section to generate metadata following an acquisition of the identifier and the time of the detection of the voice control signal at the control signal detecting section and the corresponding attribute information relevant to the performer at the control signal attribute information managing section; and
    a log analyzing section for:
        a) generating log data indicating start and finish times for the control signal, the start and finish times being determined based on the identified time of detection for the control signal, and
        b) outputting the log data to the index generating section.

12. An index imparting system, comprising:
    a processor;
    a memory coupled to the processor to store a database, wherein the database comprising (i) an identifier for uniquely specifying each of the VCR control signals of various kinds of devices and (ii) an attribute information which describes the data being recorded or reproduced by the VCR, the attribute information corresponding to the identifier of the VCR of the various kinds of devices or each of the various kinds of devices;
    a control signal detecting section to (1) identify a VCR, the VCR generates a control signal in response to the VCR being selected by a switch, the VCR being identified by an identifier in the control signal that uniquely identifies the VCR, and to (2) identify a time of a detection of the control signal;
    a control signal attribute information managing section to manage the identifier and corresponding attribute information of the control signal of the VCR, and to identify the attribute information of the control signal of the VCR stored in the database depending on the identifier of the VCR obtained at the control signal detecting section, wherein the control signal attribute information managing section includes a database searching section connected to the database which stores detailed information of attribute information and automatically imparts the detailed information obtained from the database to metadata generated at the index generating section;
    an index generating section to generate metadata following an acquisition of the identifier and the time of the control signal of the VCR at the control signal detecting section and the corresponding attribute information relevant to the VCR at the control signal attribute information managing section; and
    a log analyzing section for:
        a) generating log data indicating start and finish times for the control signal, the start and finish times being determined based on the identified time of detection for the control signal, and
        b) outputting the log data to the index generating section.

13. An index imparting system, comprising:
    a processor;
    a memory coupled to the processor to store a database, wherein the database comprises (i) an identifier for uniquely specifying each of the telop control signals of various kinds of devices and (ii) an attribute information which describes the data being reproduced by the telop, the attribute information corresponding to the identifier of the telop of the various kinds of devices or each of the various kinds of devices;
    a control signal detecting section to (1) identify a telop, the telop generates a control signal in response to the telop being selected by a switch, the telop being identified by an identifier in the control signal that uniquely identifies the telop, and to (2) identify a time of a detection of the control signal;
    a control signal attribute information managing section to manage the identifier and corresponding attribute information the control signal of the telop, and to identify the attribute information of the control signal of the telop stored in the database depending on the identifier of the telop obtained at the control signal detecting section, wherein the control signal attribute information managing section includes a database searching section connected to the database which stores detailed information of attribute information and automatically imparts the detailed information obtained from the database to metadata generated at the index generating section;

an index generating section to generate metadata following an acquisition of the identifier and the time of the detection of the control signal of the telop at the control signal detecting section and the corresponding attribute information relevant to the telop at the control signal attribute information managing section; and a log analyzing section for:
 a) generating log data indicating start and finish times for the control signal, the start and finish times being determined based on the identified time of detection for the control signal, and
 b) outputting the log data to the index generating section.

* * * * *